United States Patent
Zhang et al.

(10) Patent No.: US 11,737,086 B2
(45) Date of Patent: Aug. 22, 2023

(54) RESOURCE SCHEDULING INDICATION METHOD AND APPARATUS AND COMMUNICATION SYSTEM

(71) Applicant: FUJITSU LIMITED, Kawasaki (JP)

(72) Inventors: Guoyu Zhang, Beijing (CN); Qinyan Jiang, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 18 days.

(21) Appl. No.: 17/140,618

(22) Filed: Jan. 4, 2021

(65) Prior Publication Data
US 2021/0127411 A1 Apr. 29, 2021

Related U.S. Application Data

(63) Continuation of application No. PCT/CN2018/098675, filed on Aug. 3, 2018.

(51) Int. Cl.
*H04W 72/12* (2023.01)
*H04W 72/04* (2023.01)
(Continued)

(52) U.S. Cl.
CPC ... *H04W 72/1268* (2013.01); *H04W 72/0453* (2013.01); *H04W 72/21* (2023.01);
(Continued)

(58) Field of Classification Search
CPC ......... H04W 72/0453; H04W 72/1257; H04W 72/1284; H04W 72/04; H04W 76/27;
(Continued)

(56) References Cited

U.S. PATENT DOCUMENTS 10,326,503 B2 6/2019 Lee et al.
2009/0010219 A1 1/2009 Lee et al.
(Continued)

FOREIGN PATENT DOCUMENTS

CN 101345974 A 1/2009
CN 101778449 A 7/2010
(Continued)

OTHER PUBLICATIONS

Extended European search report with supplementary European search report and the European search opinion issued by the European Patent Office for corresponding European Patent Application No. 18928272.6-1215, dated Jul. 14, 2021.
(Continued)

*Primary Examiner* — Candal Elpenord
(74) *Attorney, Agent, or Firm* — Myers Wolin, LLC

(57) ABSTRACT

A resource scheduling indication method and apparatus and a communication system. The resource scheduling indication method includes: receiving by a terminal equipment resource scheduling indication information transmitted by a network device and used for indicating an uplink transmission resource, the uplink transmission resource including at least one resource scheduling unit; wherein one resource scheduling unit is a set of subcarrier clusters distributed spaced apart in a frequency domain in an integer number of scheduled bandwidth units; and transmitting uplink data on the uplink transmission resource by the terminal equipment.

7 Claims, 8 Drawing Sheets

201 a terminal equipment receives resource scheduling indication information transmitted by a network device and used for indicating an uplink transmission resource, the uplink transmission resource including at least one resource scheduling unit; wherein one resource scheduling unit is a set of subcarrier clusters distributed spaced apart in a frequency domain in an integer number of scheduled bandwidth units

202 the terminal equipment transmits uplink data on the uplink transmission resource

(51) Int. Cl.
  *H04W 76/27* (2018.01)
  *H04W 80/02* (2009.01)
  *H04W 72/1268* (2023.01)
  *H04W 72/0453* (2023.01)
  *H04W 72/21* (2023.01)
  *H04W 72/50* (2023.01)

(52) U.S. Cl.
  CPC ......... *H04W 72/535* (2023.01); *H04W 76/27* (2018.02); *H04W 80/02* (2013.01)

(58) Field of Classification Search
  CPC . H04W 80/02; H04W 72/1268; H04W 72/21; H04W 72/535; H04W 72/23; H04L 5/003; H04L 5/0094; H04L 5/001
  USPC .................................................. 370/329–330
  See application file for complete search history.

(56) References Cited

U.S. PATENT DOCUMENTS

| | | | |
|---|---|---|---|
| 2015/0156638 A1 | 6/2015 | Yerramalli et al. | |
| 2016/0081105 A1* | 3/2016 | Mizusawa | H04W 72/0453 370/329 |
| 2017/0135105 A1 | 5/2017 | Li et al. | |
| 2017/0230972 A1* | 8/2017 | Wang | H04L 5/0053 |
| 2018/0352571 A1* | 12/2018 | Wang | H04W 72/0453 |
| 2019/0037607 A1 | 1/2019 | Ahn et al. | |
| 2019/0124675 A1 | 4/2019 | Gao et al. | |
| 2020/0021999 A1* | 1/2020 | Park | H04W 76/11 |
| 2020/0028740 A1* | 1/2020 | Kim | H04L 41/0803 |
| 2020/0059961 A1 | 2/2020 | Do et al. | |
| 2020/0119894 A1 | 4/2020 | Jia et al. | |
| 2020/0275490 A1* | 8/2020 | Li | H04W 74/0833 |

FOREIGN PATENT DOCUMENTS

| | | |
|---|---|---|
| CN | 105099634 A | 11/2015 |
| CN | 105898872 A | 8/2016 |
| CN | 106385709 A | 2/2017 |
| CN | 107733591 A | 2/2018 |
| EP | 3 319 384 A1 | 5/2018 |
| JP | 2009-524976 A | 7/2009 |
| JP | 2011-518489 A | 6/2011 |
| JP | 2020-522961 A | 7/2020 |
| JP | 2021-510483 A | 4/2021 |
| WO | 2017/131458 A1 | 8/2017 |
| WO | 2017/157466 A1 | 9/2017 |
| WO | 2018/080758 A1 | 5/2018 |
| WO | 2018224042 A1 | 12/2018 |
| WO | 2019/137777 A1 | 7/2019 |

OTHER PUBLICATIONS

LG Electronics, "Remaining issues on DCI contents and formats", Agenda Item: 7.1.3.1.4, 3GPP TSG-RAN WG1 Meeting #93, R1-1806618, Busan, Korea, May 21-25, 2018.
International Search Report and Written Opinions of the International Searching Authority issued for the PCT application No. PCT/CN2018/098675 dated Apr. 3, 2019, with English translation.
The First Examination Report issued by the Indian Patent Office for corresponding Indian Patent Application No. 202037056253, dated Jan. 4, 2022, with an English translation.
Notice of Reasons for Refusal issued by the Japan Patent Office for corresponding Japanese Patent Application No. 2020-573248, dated Mar. 15, 2022, with an English translation.
Ericsson, "On interface design for NR-U uplink", Agenda Item 7.6.5, 3GPP TSG RAN WG1, Meeting #92b, R1-1805018, Sanya, China, Apr. 16-20, 2018.
First Notification of Office Action and Search Report issued by the China National Intellectual Property Administration for corresponding Chinese Patent Application No. 201880095282.4, dated Apr. 29, 2023, with an English translation.

* cited by examiner

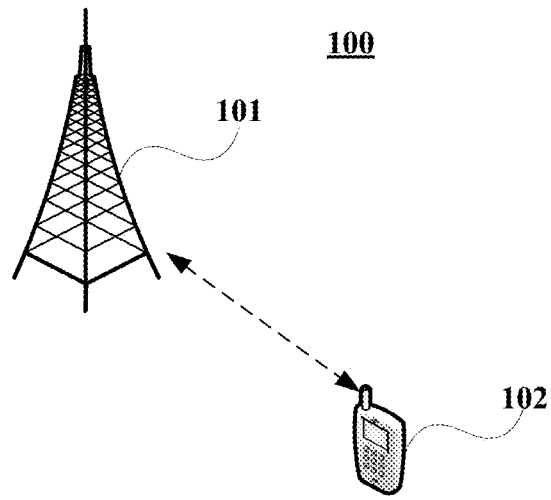

Fig.1

```
                                                                   201
┌─────────────────────────────────────────────────────────────────────┐
│   a terminal equipment receives resource scheduling indication information
│  transmitted by a network device and used for indicating an uplink transmission
│    resource, the uplink transmission resource including at least one resource
│   scheduling unit; wherein one resource scheduling unit is a set of subcarrier
│  clusters distributed spaced apart in a frequency domain in an integer number of
│                            scheduled bandwidth units
└─────────────────────────────────────────────────────────────────────┘
                                                                   202
┌─────────────────────────────────────────────────────────────────────┐
│                          the terminal equipment
│           transmits uplink data on the uplink transmission resource
└─────────────────────────────────────────────────────────────────────┘
```

Fig.2

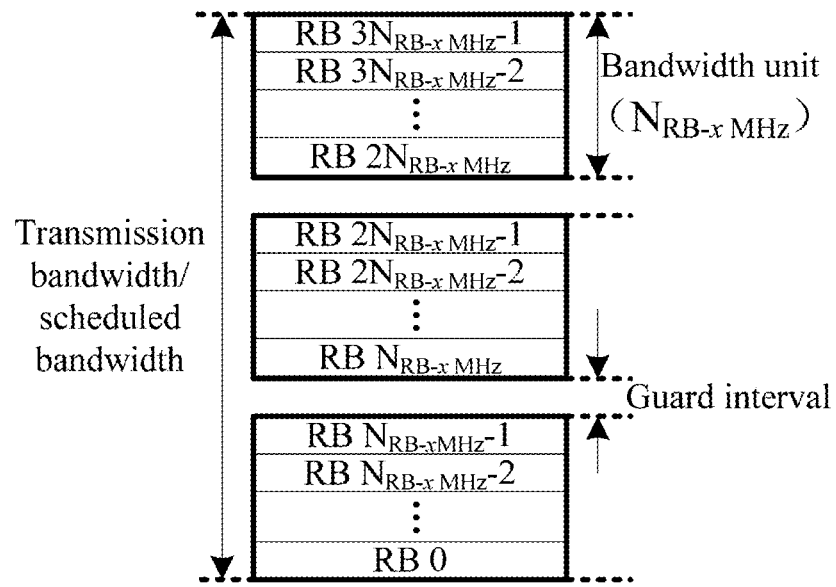

Fig.6

701 a terminal equipment receives resource configuration information transmitted by a network device, the resource configuration information being used for indicating one or more bandwidth units configured by the network device for the terminal equipment on a frequency carrier

702 the terminal equipment receives bandwidth unit indication information transmitted by the network device, the bandwidth unit indication information being used to indicate the integer number of scheduled bandwidth units in the configured one or more bandwidth units

Fig.7

RESOURCE SCHEDULING INDICATION METHOD AND APPARATUS AND COMMUNICATION SYSTEM

CROSS-REFERENCE TO RELATED APPLICATION

This application is a continuation application of International Application PCT/CN2018/098675 filed on Aug. 3, 2018 and designated the U.S., the entire contents of which are incorporated herein by reference.

TECHNICAL FIELD

This disclosure relates to the field of communication technologies, and in particular to a resource scheduling indication method and apparatus and a communication system.

BACKGROUND

In recent years, wireless communication technologies have developed rapidly, and standardization of the 3rd Generation Partnership Project (3GPP) has been developed to Rel. 15 (Release 15). Starting from Rel. 13, based on the consideration of further capacity expansion, studies of unlicensed frequency band transmission has begun in the long term evolution (LTE) technology. Starting from Rel. 14, enhanced licensed spectrum assisted access (eLAA) has been introduced, and an uplink transmission mechanism of unlicensed frequency bands has been introduced in the eLAA. And at the same time, in order to ensure coexistence with other technologies working in unlicensed frequency bands, a channel competition access mechanism of listen-before-talk is adopted.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Data transmission of eLAA is carried out under the framework of carrier aggregation, that is, a terminal equipment first accesses the network via a licensed frequency band, and then a network device allocates unlicensed frequency band carriers to the terminal equipment. Each carrier needs scheduling control signaling to schedule transmission of the carriers. In an LTE system, a maximum bandwidth of a carrier is 20 MHz.

In future wireless communication systems, such as 5G and new radio (NR) systems, a maximum channel bandwidth may reach 100 MHz (i.e. a large bandwidth). In current discussions, an NR broadband transmission technology may also be applied to unlicensed frequency bands. However, it was found by the inventor that there is currently no method for scheduling data transmission resources in using large bandwidth transmission on a frequency carrier of an NR unlicensed frequency band.

In order to solve the above problem, embodiments of this disclosure provide a resource scheduling indication method and apparatus and a communication system.

According to a first aspect of the embodiments of this disclosure, there is provided a resource scheduling indication apparatus, wherein the apparatus includes:

a first receiving unit configured to receive resource scheduling indication information transmitted by a network device and used for indicating an uplink transmission resource, the uplink transmission resource including at least one resource scheduling unit; wherein one resource scheduling unit is a set of subcarrier clusters distributed spaced apart in a frequency domain in an integer number of scheduled bandwidth units; and a first transmitting unit configured to transmit uplink data on the uplink transmission resource.

According to a second aspect of the embodiments of this disclosure, there is provided a resource scheduling indication apparatus, wherein the apparatus includes:

a second transmitting unit configured to transmit resource scheduling indication information used for indicating an uplink transmission resource to a terminal equipment, the uplink transmission resource including at least one resource scheduling unit; wherein, one resource scheduling unit is a set of sub carrier clusters distributed spaced apart in a frequency domain in an integer number of scheduled bandwidth units; and a second receiving unit configured to receive, on the uplink transmission resource, uplink data transmitted by the terminal equipment.

According to a third aspect of the embodiments of this disclosure, there is provided a resource indication apparatus, wherein the apparatus includes:

a third receiving unit configured to receive resource configuration information transmitted by a network device, the resource configuration information being used for indicating one or more bandwidth units on a frequency carrier configured by the network device for a terminal equipment.

According to a fourth aspect of the embodiments of this disclosure, there is provided a resource indication apparatus, wherein the apparatus includes:

a third transmitting unit configured to transmit resource configuration information to a terminal equipment, the resource configuration information being used for indicating one or more bandwidth units on a frequency carrier configured by a network device for the terminal equipment.

According to a fifth aspect of the embodiments of this disclosure, there is provided a communication system, including the resource scheduling indication apparatus as described in the first or second aspect, or including the resource indication apparatus as described in the third or fourth aspect.

An advantage of the embodiments of this disclosure exists in that the network device schedules the subcarrier cluster sets spaced apart in the frequency domain contained in the integer number of bandwidth units on a single carrier for transmitting the uplink data, thereby reducing activation and deactivation processes of multiple carriers, increasing flexibility of the scheduling while ensuring the throughput, efficiently improving utilization of radio resources, increasing the data transmission efficiency, and solving the problems in the related art.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort.

In the drawings:

FIG. 1 is a schematic diagram of a communication system of an embodiment of this disclosure;

FIG. 2 is a flowchart of a resource scheduling indication method of Embodiment 1;

FIG. 3A and FIG. 3B are schematic diagrams of distribution of resource scheduling units;

FIG. 4 is a flowchart of a resource scheduling indication method of Embodiment 2;

FIG. 5 is a flowchart of a resource indication method of Embodiment 3;

FIG. 6 is a schematic diagram of a guard period of Embodiment 3;

FIG. 7 is a flowchart of a resource indication method of Embodiment 4;

FIG. 8 is a flowchart of a data transmission method of Embodiment 4;

FIG. 9 is a schematic diagram of a structure of a resource scheduling indication apparatus of Embodiment 5;

FIG. 10 is a schematic diagram of a structure of a resource scheduling indication apparatus of Embodiment 6;

FIG. 11 is a schematic diagram of a structure of a resource indication apparatus of Embodiment 7;

Figure 12:
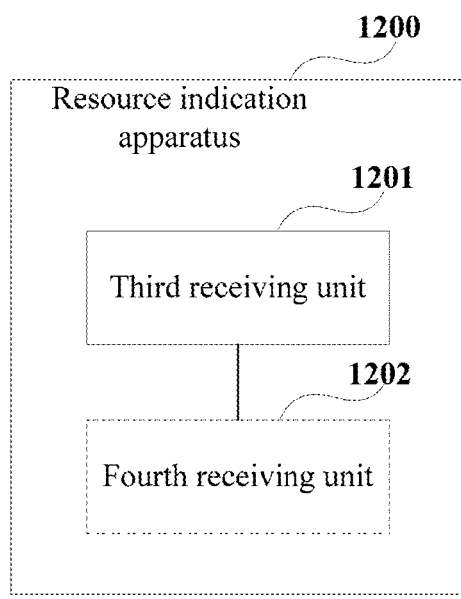
Figure 13:
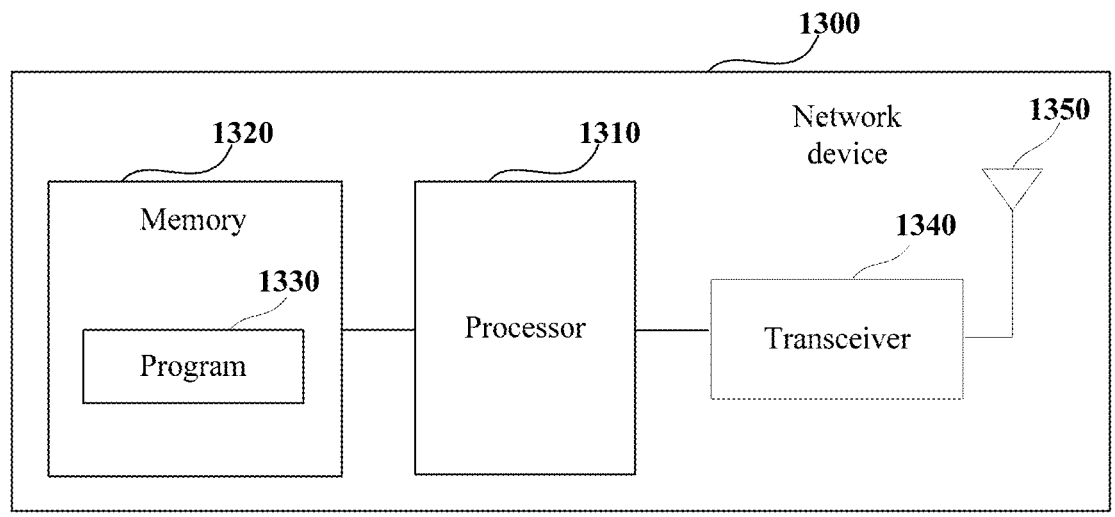
Figure 14:
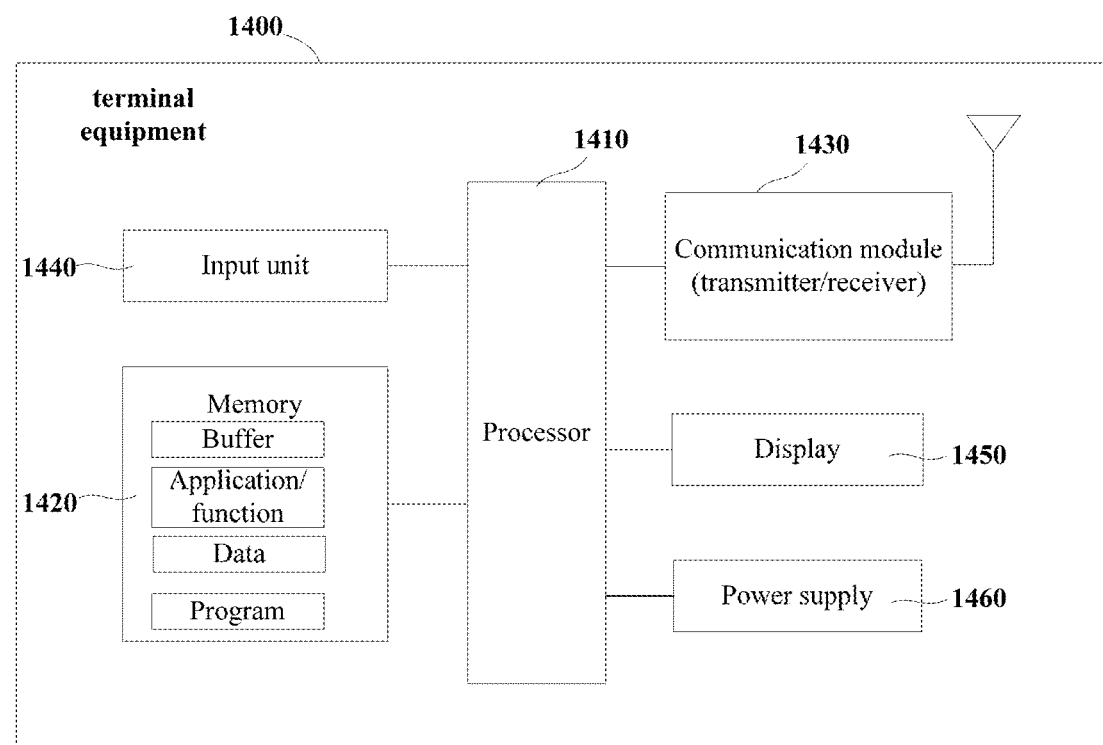

FIG. 12 is a schematic diagram of a structure of a resource indication apparatus of Embodiment 8;

FIG. 13 is a schematic diagram of a structure of a network device of Embodiment 9; and FIG. 14 is a schematic diagram of a structure of terminal equipment of Embodiment 9.

DETAILED DESCRIPTION OF THE DISCLOSURE

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims. The embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a dedicated geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102. For the sake of simplicity, an example having one terminal equipment and a network device is schematically given in FIG. 1; however, the embodiment of this disclosure is not limited thereto.

In the embodiment of this disclosure, existing traffics or traffics that may be implemented in the future may be performed between the network device 101 and the terminal equipment 102. For example, such traffics may include but not limited to an enhanced mobile broadband (eMBB), massive machine type communication (MTC), and ultra-reliable and low-latency communication (URLLC), etc.

In order to meet requirements of occupied channel bandwidth (OCB) and power spectral density (PSD), a resource block set (interlace) is adopted in the LTE eLAA as a basic unit of uplink transmission resource allocation, an interlace consisting of 10 resource blocks (RBs). These 10 RBs are distributed in a 20 MHz bandwidth at equal spacings; for example, interlace 0 consists of RB0, RB10, RB20, . . . RB90. The network device will allocate one or more interlaces to the terminal equipment via uplink scheduling signaling for the terminal equipment to perform uplink data transmission.

An unlicensed frequency band physical layer access technology based on new radio (NR) has been discussed from the RAN1 #92 meeting, wherein it was clearly pointed out that application of NR wideband transmission technology in the unlicensed band needs to be discussed, and it was specified that a size of a transmission bandwidth of an NR unlicensed frequency band should be an integer multiple of 20 MHz in case of being unable to ensure that there exists no coexistence with other transmission technologies. A method for scheduling data transmission resources on a frequency carrier in transmission by using large bandwidths greater than 20 MHz for the NR unlicensed frequency band has not been discussed till now. The embodiments of this disclosure provide a resource scheduling indication method and apparatus and a communication system, aiming at being applicable to wideband transmission and efficiently improving utilization of radio resource while ensuring OSB/PSD.

It should be noted that the embodiments of this disclosure are described by taking an unlicensed frequency band as an example. However, this disclosure is not limited thereto, and is also applicable to other scenarios where similar problems exist.

The embodiments of this disclosure shall be described below with reference to the accompanying drawings.

Embodiment 1

FIG. 2 is a flowchart of a resource scheduling indication method of Embodiment 1, applicable to a terminal equipment side. As shown in FIG. 2, the method includes:

step 201: a terminal equipment receives resource scheduling indication information transmitted by a network device and used for indicating an uplink transmission resource, the uplink transmission resource including at least one resource scheduling unit; wherein one resource scheduling unit is a set of subcarrier clusters distributed spaced apart in a frequency domain in an integer number (M1) of scheduled bandwidth units; and step 202: the terminal equipment transmits uplink data on the uplink transmission resource.

In this embodiment, in case of wideband transmission, a size of a transmission bandwidth should be an integer multiple of 20 MHz in case of being unable to ensure that there exists no coexistence with other transmission technologies. The network device may configure or indicate the transmission bandwidth of the terminal equipment by taking a bandwidth unit as a unit.

In this embodiment, the integer number of scheduled bandwidth units are frequency-domain resources on a frequency carrier of an unlicensed frequency band, and a frequency domain width of the scheduled bandwidth units is equal to a first value, for example, the first value is 20 MHz, or 40 MHz, or 80 MHz, or 100 MHz; or, the first value may be expressed as the number of resource blocks (RBs), and the number of resource blocks contained in the scheduled bandwidth units is equal to the first value, the first value being the number of resource blocks contained in an integer number of 20 MHz bandwidth resources. A particular value of number is related to a subcarrier interval. For example, when the subcarrier interval is 15 MHz, a bandwidth of 20 MHz contains 106 RBs, and a bandwidth unit contains 106 RBs (one RB contains 12 subcarriers); and a bandwidth of 40 MHz (equivalent to two bandwidths 20 MHz) contains 216 RBs, and a bandwidth unit contains 216 RBs (one RB contains 12 subcarriers), and so on, which shall not be enumerated herein any further.

In this embodiment, the first value of the frequency domain width of the bandwidth unit may be a default value. For example, the frequency domain width of the bandwidth unit may be predefined by the network device and terminal equipment, or the frequency domain width of the bandwidth unit may be configured by the network device via high-layer signaling, or the bandwidth unit may be configured by the network device via high-layer signaling and then indicated to the terminal equipment, and this embodiment is not limited thereto.

In this embodiment, the network device may pre-configure the transmission bandwidth for the terminal equipment. The transmission bandwidth may be used for the terminal equipment to transmit uplink data, but it is not necessary that the transmission bandwidth is entirely used for transmitting the uplink data. The network device may indicate a scheduling bandwidth actually scheduled by the terminal equipment in the transmission bandwidth, and allocate uplink transmission resources on the scheduling bandwidth for the terminal equipment for transmitting uplink data. The above transmission bandwidth and scheduling bandwidth shall be respectively described below.

In this embodiment, the transmission bandwidth includes one or more bandwidth units configured by the network device for the terminal equipment on a frequency carrier, wherein the frequency carrier may be an unlicensed band frequency; however, this embodiment is not limited thereto.

In this embodiment, before step 201, the method may further include (not shown): S1: the terminal equipment receives resource configuration information transmitted by the network device. The resource configuration information is used to indicate one or more (M2) bandwidth units configured on one frequency carrier for the terminal equipment, and may include information on position and/or size of the configured M2 bandwidth units. For example, when the first value of the frequency domain width of the bandwidth unit is the default value, the information on position includes a sequence number(s) of a first and/or a last resource block included in the configured bandwidth unit. Alternatively, information on size may further be included. For example, the information on size may be the number M2 of the configured bandwidth units, or the number of resource blocks included in the M2 configured bandwidth units. For example, when the first value of the frequency domain width of the bandwidth unit is an optional value, the resource configuration information may further include a sequence number(s) of a first and/or a last resource block of each bandwidth unit in the M2 configured bandwidth units and the number (the first value) of resource blocks contained therein; wherein the numbers of resource blocks contained in each bandwidth unit in the M2 configured bandwidth units may be identical or different, and this embodiment is not limited thereto.

In this embodiment, the terminal equipment obtains the resource configuration information via high-layer configuration signaling or broadcast information transmitted by the network device. For example, the resource configuration information may be included in the high-layer configuration signaling or broadcast information transmitted by the network device to the terminal equipment, the broadcast information being able to be carried in a master information block (MIB) or a system information block (SIB), or the resource configuration information being able to be implicitly indicated by information carried by the broadcast information (for example, the number of resource blocks contained in the bandwidth unit may be implicitly determined according to a frequency carrier obtained via the system information; however, it is not limited thereto).

In this embodiment, in one implementation, the scheduling bandwidth may be equal to the transmission bandwidth, the scheduling bandwidth is equal to an integer number (M1) of scheduled bandwidth units, and the transmission bandwidth is equal to one or more (M2) configured bandwidth units, namely, M1 is equal to M2, and the configured M2 bandwidth units are the scheduled M1 bandwidth units. In other words, after the terminal equipment receives the resource configuration information, it may determine the scheduled bandwidth units according to the M2 bandwidth units indicated by the determined resource configuration information M1 bandwidth units, and the two are identical.

In this embodiment, in one implementation, the scheduling bandwidth may be less than or equal to the transmission bandwidth, the scheduling bandwidth is equal to an integer number (M1) of scheduled bandwidth units, and the transmission bandwidth is equal to one or more (M2) configured bandwidth units, that is, M1 is less than or equal to M2, and the configured M2 bandwidth units include the scheduled M1 bandwidth units.

In this implementation, the method may further include (not shown): S2: the terminal equipment receives bandwidth unit indication information transmitted by the network device, the bandwidth unit indication information being used to indicate the integer number of scheduled bandwidth units in the configured one or more bandwidth units, that is, the bandwidth unit indication information is used to indicate which of the configured M2 bandwidth units are the scheduled M1 bandwidth units.

In one implementation, the bandwidth unit indication information may include indices of the integer number of scheduled bandwidth units, or the bandwidth unit indication information is a bitmap corresponding to the configured M2 bandwidth units, each bit indicating whether a corresponding configured bandwidth unit is a scheduled bandwidth unit. For example, the bandwidth unit indication information includes M1 indexes, respectively identifying the scheduled M1 bandwidth units, or the bandwidth unit indication information is of M2 bits, each bit corresponding to a configured bandwidth unit, when a value of the bit is 0, it indicates that the configured bandwidth unit is not a scheduled bandwidth unit; and when a value of the bit is 1, it indicates that the configured bandwidth unit is a scheduled bandwidth unit, that is, among the M2 bits, the number of 1 is M1. The above description is given bay taking 0 and 1 as examples; however, this embodiment is not limited thereto.

In another implementation, in order to indicate the scheduled bandwidth unit more conveniently, the configured M2 bandwidth units may also be divided into at least one frequency bandwidth, each frequency bandwidth including at least one configured bandwidth unit, and the bandwidth unit indication information indicates the scheduled bandwidth unit by indicating a frequency bandwidth index. In this implementation, the resource configuration information further includes configuration information of a frequency bandwidth, the frequency bandwidth including at least one configured bandwidth unit. In this implementation, the configuration information of the frequency bandwidth includes an index value of the at least one configured bandwidth unit, and/or the number of the at least one configured bandwidth unit.

For example, for the M2 configured bandwidth units, some or all of them form M3 frequency bandwidths, the M3 frequency bandwidths are uniquely identified by an index, and for each frequency bandwidth, it includes at least one configured bandwidth unit, and numbers of configured bandwidth units included in each frequency bandwidth of the M3 frequency bandwidths may be identical or different. The configuration information of the M3 frequency bandwidths may be contained in the resource configuration information, and for a frequency bandwidth identified by each index, the configuration information of the frequency bandwidth includes a value of the index of the at least one configured bandwidth unit included in the frequency bandwidth, and/or the number of the at least one configured bandwidth unit, and alternatively, it may further include an index of a corresponding frequency bandwidth. In this implementation, the bandwidth unit indication information may include an index of the frequency bandwidth, thereby indicating that at least one configured bandwidth unit included in the frequency bandwidth identified by the index is a scheduled bandwidth unit. In this embodiment, the terminal equipment obtains the bandwidth unit indication information via at least one of radio resource control (RRC) signaling, media access control (MAC) signaling and physical layer control information transmitted by the network device.

In this embodiment, the frequency bandwidth and/or bandwidth unit may be a bandwidth part (BWP) defined in NR, or may be other defined bandwidth unit(s), and this embodiment is not limited thereto.

In this embodiment, the integer number of scheduled bandwidth units do not overlap with each other, that is, the integer number of scheduled bandwidth units do not include identical time frequency resources.

How to determine the integer number of scheduled bandwidth units is described above; wherein both M1 and M2 are integers greater than or equal to 1, and M2 is greater than or equal to M1. And how to indicate the scheduled uplink transmission resources in the integer number of scheduled bandwidth units shall be described below.

In this embodiment, as the one frequency carrier is an unlicensed band frequency, the integer number of bandwidth units scheduled on it are also frequency domain resources of the unlicensed band.

In this embodiment, a resource scheduling unit is a set of subcarrier clusters spaced in the frequency domain in the integer number of scheduled bandwidth units. The subcarrier clusters may be RBs, or may be a set of an integer number of subcarriers. For sake of convenience of explanation, a resource scheduling unit is referred to as an interlace in the following description. A form of distribution of the resource scheduling unit on the integer number of scheduled bandwidth units shall be described below.

In one implementation, the integer number of scheduled bandwidth units include at least two resource scheduling units (interlaces), and two subcarrier clusters with an interval of a first fixed value therebetween on frequency domain resources contained in the integer number of scheduled bandwidth units belong to the same resource scheduling unit, that is, two subcarrier clusters satisfying that an interval therebetween is the first fixed value belong to the same interlace. In other words, subcarrier clusters contained in a resource scheduling unit are evenly distributed at equal intervals on frequency domain resources in the integer number of scheduled bandwidth units, and the interval is equal to the first fixed value. For example, the resource scheduling units in the integer number of scheduled bandwidth units are identified by indices, and indices of the at least two resource scheduling units are different, that is, each interlace is assigned an index that uniquely identifies the interlace.

Figure 3A:
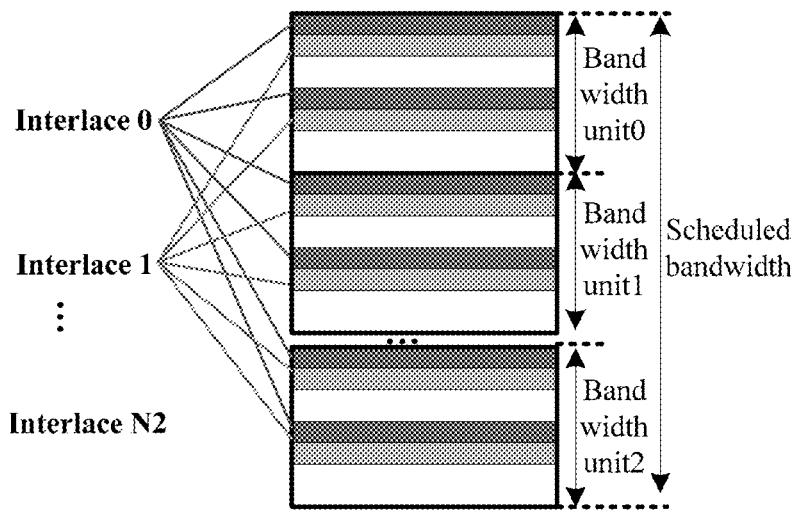

FIG. 3A is a schematic diagram of distribution of resource scheduling units in this implementation. As shown in FIG. 3A, on the scheduled M1 bandwidth units, N1 subcarrier clusters and N2 resource scheduling units (interlaces) are totally contained, their indices are 0, 1, . . . , N2−1, respectively, and an interval between the frequency domain resources contained in the M1 bandwidth units is the first fixed value; for example, two subcarrier clusters of N2 belong to an interlace, that is, subcarrier clusters contained in an interlace are distributed at even intervals on frequency domain resources of an integer number of scheduled bandwidth units, an interval is equal to the first fixed value N2, and the first fixed value is equal to the number of interlaces; wherein the numbers of subcarrier clusters contained in the interlaces in the N2 resource scheduling units (interlaces) may be identical or different. For example, former $$N2 - \left(N2 \times \left\lceil \frac{N1}{N2} \right\rceil - N1\right)$$

interlaces contain $$\left\lceil \frac{N1}{N2} \right\rceil$$

subcarrier clusters, and latter $$N2 \times \left\lceil \frac{N1}{N2} \right\rceil - N1$$

interlaces contain $$\left\lceil \frac{N1}{N2} \right\rceil - 1$$

subcarrier clusters; or, for example, former $$N1 - \left(N2 \times \left\lfloor \frac{N1}{N2} \right\rfloor\right)$$

interlaces contain $$\left\lfloor \frac{N1}{N2} \right\rfloor + 1$$

subcarrier clusters, and latter $$\left\lfloor \frac{N1}{N2} \right\rfloor - N1 + N2 \times \left\lfloor \frac{N1}{N2} \right\rfloor$$

interlaces contain $$\left\lceil \frac{N1}{N2} \right\rceil$$

subcarrier clusters.

For example, a 30 kHz subcarrier interval in a 40 MHz bandwidth includes two scheduled bandwidth units, i.e. M1=2, in which 106 RBs are contained, with indices RB0 to RB106. If the subcarrier cluster is in unit of RBs, N1=106. If the two bandwidth units contain 10 interlaces, that is, the first fixed value is 10, it is calculated that an average of 11 (106/10 is rounded up) RBs should be contained in each interlace, and last 4 (10×11−106) interlaces may contain 10 RBs, that is, former 6 interlaces contain 10 RBs, and latter 4 interlaces contain 10 RBs. Hence, the 11 RBs contained in one interlace are RB0, RB10, RB20, . . . RB100, respectively, and the 10 RBs contained in a 10th interlace are RB9, RB19, . . . RB99, respectively.

Or, it is calculated that an average of 10 (106/10 is rounded down) RBs should be contained in each interlace, and former 6 (106−10×10) interlaces may contain 11 RBs, that is, later 4 interlaces contain 10 RBs, and former 6 interlaces contain 11 RBs. Hence, the 10 RBs contained in a first interlace are RB0, RB10, RB20, . . . RB100, respectively, and the 10 RBs contained in a 10th interlace are RB9, RB19, . . . RB99, respectively.

In one implementation, subcarrier clusters included in a resource scheduling unit belong to a scheduled bandwidth unit, and each scheduled bandwidth unit includes at least two resource scheduling units (interlaces); wherein two subcarrier clusters spaced apart by a second fixed value on frequency domain resources contained in one of the scheduled bandwidth units belong to the same resource scheduling unit. That is, two subcarrier clusters satisfying that an interval therebetween is the second fixed value belong to the same interlace. In other words, subcarrier clusters contained in a resource scheduling unit are evenly distributed at equal intervals on a scheduled bandwidth unit, and the interval is equal to the second fixed value. For example, the at least two resource scheduling units included in the scheduled bandwidth unit are identified by indices, and indices of the at least two resource scheduling units are different, that is, each interlace of a scheduled bandwidth unit is assigned an index that uniquely identifies the interlace in the scheduled bandwidth unit.

Figure 3B:
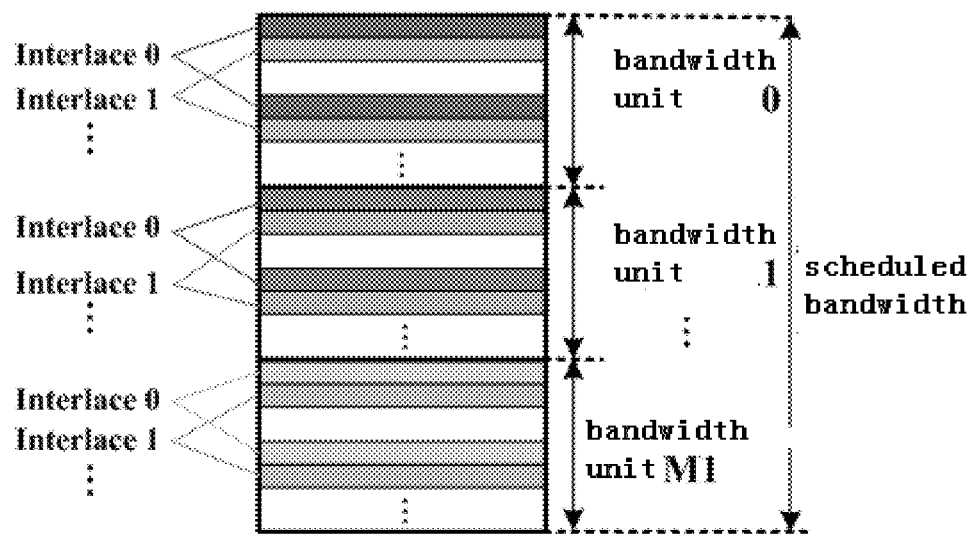

FIG. 3B is a schematic diagram of distribution of resource scheduling units in this implementation. As shown in FIG. 3B, on the scheduled M1 bandwidth units, N1 subcarrier clusters are totally contained. Numbers of subcarrier clusters contained in the bandwidth units may be identical or different. Distribution of resource scheduling units in this bandwidth unit shall be described below by taking one bandwidth unit (a Qth) in M1 bandwidth units as an example. Distribution of resource scheduling units of other bandwidth units is similar to that in the Q-th bandwidth unit, which shall not be repeated herein any further. For the Q-th bandwidth unit, it totally contains N3 subcarrier clusters and N4 resource scheduling units (interlaces). An interval between the frequency domain resources contained in the Q-th bandwidth unit is the second fixed value; for example, two subcarrier clusters of N4 belong to an interlace, that is, subcarrier clusters contained in an interlace are distributed at even intervals on frequency domain resources of the Q-th bandwidth unit, and an interval is equal to the second fixed value, such as N4; wherein the numbers of subcarrier clusters contained in the interlaces in the N4 resource scheduling units (interlaces) may be identical or different. For example, former $$N4 - \left(N4 \times \left\lceil \frac{N3}{N4} \right\rceil - N3\right)$$

interlaces contain $$\left\lceil \frac{N3}{N4} \right\rceil$$

subcarrier clusters, and latter $$N4 \times \left\lceil \frac{N3}{N4} \right\rceil - N3$$

interlaces contain $$\left\lceil \frac{N3}{N4} \right\rceil - 1$$

subcarrier clusters; or, for example, former $$N3 - \left(N4 \times \left\lfloor \frac{N3}{N4} \right\rfloor\right)$$

interlaces contain $$\left\lfloor \frac{N3}{N4} \right\rfloor + 1$$

subcarrier clusters, and latter $$\left\lfloor \frac{N3}{N4} \right\rfloor - N3 + N4 \times \left\lfloor \frac{N3}{N4} \right\rfloor$$

interlaces contain $$\left\lfloor \frac{N3}{N4} \right\rfloor$$

subcarrier clusters. For example, for each bandwidth unit, interlaces contained therein are separately identified by indices in a bandwidth unit. For example, for bandwidth unit 0 in FIG. 3B, it contains interlaces 0, 1, . . . , N40 (not shown), for bandwidth unit 1 in FIG. 3B, it contains interlaces 0, 1, . . . , N41 (not shown), an interlace with an index 0 in bandwidth unit 0 identifies only the interlaces in bandwidth unit 0, and an interlace with an index 0 in bandwidth unit 1 identifies only the interlaces in bandwidth unit 1.

In this embodiment, the network device takes the above resource scheduling units as units for allocating an uplink transmission resource for the terminal equipment, that is, the uplink transmission resource includes at least one (X) resource scheduling unit, X being greater than or equal to 1. The resource scheduling indication information includes one resource allocation domain used to indicate the uplink transmission resource, the resource allocation domain including an index and/or the number of the at least one (X) resource scheduling unit. And the resource scheduling indication information may be carried by at least one piece of control information.

Particular implementations of the resource scheduling indication information in examples of different distribution of resource scheduling units shall be described below by taking the examples of the distribution of the resource scheduling units in FIGS. 3A and 3B as examples.

Regarding the distribution of the resource scheduling units illustrated in FIG. 3A, the resource scheduling indication information may be carried by a piece of control information, and the resource scheduling indication information includes one resource allocation domain, the resource allocation domain indicating scheduled resource scheduling units in the integer number of scheduled bandwidth units. For example, the resource scheduling indication information is carried by DCI, the DCI including one resource allocation domain, the resource allocation domain including interlaces with indices of 0, 3 and Y, indicating that interlaces with indices of 0, 3 and Y in M1 scheduled bandwidth units are scheduled, and the uplink transmission resource includes 3 interlaces.

Regarding the distribution of the resource scheduling units illustrated in FIG. 3B, in one implementation, the resource scheduling indication information is carried by a piece of control information, and the resource scheduling indication information includes one resource allocation domain, the resource allocation domain indicating that each bandwidth unit in the integer number of scheduled bandwidth units includes a resource scheduling unit corresponding to the index of the at least one resource scheduling unit that is scheduled. For example, the resource scheduling indication information is carried by DCI, the DCI including one resource allocation domain, jointly indicating scheduling of interlaces in each bandwidth unit. In this implementation, all bandwidth units in the M1 scheduled bandwidth units may have scheduled interlaces, or a part thereof may have scheduled interlaces, and which bandwidth units have scheduled interlaces may be determined according to indices of the interlaces. For example, indices of the interlaces included in the resource allocation domain are 0, 3 and Y, and if a bandwidth unit in the M1 bandwidth units contains interlaces with indices of 0, 3 and Y, the interlaces 0, 3 and Y in this bandwidth unit are scheduled as uplink transmission resources; if each bandwidth unit in the M1 bandwidth units contains interlaces to which indices of 0, 3 and Y correspond, interlaces with corresponding indices of 0, 3 and Y in each bandwidth unit are all scheduled, the uplink transmission resource includes interlaces 0, 3 and Y in each bandwidth unit in the M1 scheduled bandwidth units, and the uplink transmission resource includes 3×M1 interlaces; and if a bandwidth unit in the M1 bandwidth units does not contain interlaces with indices of 0, 3 and Y, the interlaces in this bandwidth unit are not scheduled as uplink transmission resources, or if one bandwidth unit in the M1 bandwidth units contains interlaces with indices of 0 and 3, the interlaces with corresponding indices 0 and 3 in this bandwidth unit are both scheduled. What described above is illustrative only, this embodiment is not limited thereto, and the uplink transmission resources may include all scheduled interlaces in the M1 bandwidth units.

Regarding the distribution of the resource scheduling units illustrated in FIG. 3B, in one implementation, the resource scheduling indication information is carried by a piece of control information, and the resource scheduling indication information includes at least one resource allocation domain, the number of the at least one resource allocation domain being equal to the number of bandwidth units in the integer number of scheduled bandwidth units; wherein one resource allocation domain indicates scheduled resource scheduling units in one scheduled bandwidth unit. For example, the resource scheduling indication information is carried by DCI, the DCI including M1 resource allocation domains, each resource allocation domain indicating a result of scheduling of interlaces in one corresponding scheduled bandwidth unit. For example, for a first resource allocation domain, it includes an interlace with an index of 0, an index of an interlace included in a second resource allocation domain is 1, . . . , an index of an interlace included in an M1-th resource allocation domain is 0, the interlace corresponding to the index 0 in the first bandwidth unit is scheduled, the interlace corresponding to the index 1 in the second bandwidth unit is scheduled, . . . , the interlace corresponding to the index 0 in the M1-th bandwidth unit is scheduled, and the uplink transmission resource includes all scheduled interlaces in the M1 bandwidth units.

Regarding the distribution of the resource scheduling units illustrated in FIG. 3B, in one implementation, when the resource scheduling indication information is carried by at least one piece of control information, the number of pieces of the at least one piece of control information being equal to the number of bandwidth units in the integer number of scheduled bandwidth units; wherein the resource scheduling indication information carried by one piece of control information indicates scheduled resource scheduling units in one bandwidth unit. For example, the resource scheduling indication information is carried by M1 pieces of DCI, each piece of DCI including one resource allocation domain, the resource allocation domain of each piece of DCI indicating a result of scheduling of interlaces in one corresponding scheduled bandwidth unit. For example, for a resource allocation domain of a first piece of DCI, it includes an interlace with an index of 0, an index of an interlace included in a resource allocation domain of a second piece of DCI is 1, . . . , an index of an interlace included in a resource allocation domain of an M1-th piece of DCI is 0, the interlace corresponding to the index 0 in the first bandwidth unit is scheduled, the interlace corresponding to the index 1 in the second bandwidth unit is scheduled, . . . , the interlace corresponding to the index 0 in an M1-th bandwidth unit is scheduled, and the uplink transmission resource includes all scheduled interlaces in the M1 bandwidth units.

In this embodiment, in step 201, the terminal equipment may detect the resource scheduling indication information on at least one type of resource, the type of the resource including at least one of the following: frequency domain resources of the integer number of scheduled bandwidth units, frequency domain resources of one bandwidth unit in the integer number of scheduled bandwidth units, frequency domain resources of each bandwidth unit in the integer number of scheduled bandwidth units. After the resource scheduling indication information is detected on the above bandwidth resource, the resource scheduling indication information is received. For example, when the scheduled bandwidth unit (the bandwidth unit indication information) is configured via RRC or indicated by an MAC layer, the terminal equipment may detect on a bandwidth unit corresponding to the resource scheduling indication information, or detect on a bandwidth unit in other bandwidth units in the integer number of scheduled bandwidth units than the bandwidth unit to which the resource scheduling indication information corresponds.

In this embodiment, in step 202, the terminal equipment determines the uplink transmission resources according to the resource scheduling indication information, and transmits uplink data to the network device on the uplink transmission resources.

In this embodiment, before the terminal equipment transmits the uplink transmission data, the method may further include (optional, not shown): the terminal equipment performs channel monitoring (listen-before-talk, LBT) by; wherein a unit of the channel monitoring is the bandwidth unit, that is, the terminal equipment may perform LBT detection containing a contention window on each scheduled bandwidth unit before transmitting the uplink data (that is, after a time of a contention window is idle, it proceeds with detecting a time of a contention window, and if the time is still idle, it determines that a channel on the bandwidth unit is in an idle state); or the terminal equipment performs LBT detection containing a contention window on one of the scheduled bandwidth units, and performs LBT detection containing no contention window on other bandwidth units (that is, when a time of a contention window is idle, it is determined that the channel on the bandwidth unit is in an idle state); the terminal equipment determines bandwidth units in the integer number of scheduled bandwidth units that are available for transmitting data (bandwidth units where channels in the idle state are located); and the terminal equipment transmits the uplink data on overlapped actual data transmission resources of the bandwidth units that are available for transmitting data and the uplink transmission resources.

Or, the terminal equipment performs LBT detection containing no contention window on one of the scheduled bandwidth units, and does not perform LBT detection on other bandwidth units. When a result of determination is that the channel is idle, the terminal equipment transmits the uplink data on the uplink transmission resource in the integer number M1 of scheduled bandwidth units, and when the result of determination is that the channel is busy, the terminal equipment does not transmit data, or the terminal equipment does not perform LBT detection when an interval from a last received or transmitted symbol is less than a time length of the contention window, and transmits the uplink data on overlapped actual data transmission resources of the bandwidth units that are available for transmitting data and the uplink transmission resources.

In this embodiment, the resource configuration information may further include indication information indicating whether to perform LBT detection, or indication information indicating via other information whether to perform LBT detection.

In this embodiment, by the above monitoring, a mode of the transmission bandwidth may be adaptively adjusted according to results of the channel monitoring. Due to the listen-before-talk rule of an unlicensed frequency band, an actual data transmission bandwidth in case of large bandwidth transmission needs to be determined according to LBT monitoring results.

In this embodiment, after the monitoring result is obtained and before transmitting the uplink data, the method may further include (not shown, optional):

the terminal equipment maps the uplink data onto the actual data transmission resources (determined according to the monitoring result) according to a predetermined rule; wherein, the predetermined rule is that: the uplink data are mapped in a sequential order of the frequency domain and the time domain onto resources in one scheduled bandwidth unit in the actual data transmission resources overlapping with the uplink transmission resources, and then mapped in a sequential order of the frequency domain and the time domain onto resources in next one scheduled bandwidth unit in the actual data transmission resources overlapping with the uplink transmission resources.

For example, there are Y scheduled bandwidth units corresponding to the actual data transmission resources, the uplink data are first mapped in the sequential order of the frequency domain and the time domain onto resources in a first bandwidth unit in the Y scheduled bandwidth units overlapping with the uplink transmission resources, and then mapped in a sequential order of the frequency domain and the time domain onto resources in a second bandwidth unit in the Y scheduled bandwidth units overlapping with the uplink transmission resources, and so on, until they are mapped in the sequential order of the frequency domain and the time domain onto resources in a Y-th bandwidth unit in the Y scheduled bandwidth units overlapping with the transmission resources. After the mapping is completed, the uplink data are transmitted on the actual data transmission resources.

In this embodiment, with the above mapping method, each bandwidth unit is a continuous data string. On the unlicensed frequency band, when the terminal equipment transmits data only on the bandwidth unit where the channel of which the LBT detection result is that it in the idle state is located, the data may still be decoded or partially decoded, thereby improving efficiency of data decoding.

In one implementation, a resource included in one scheduled bandwidth unit in the actual data transmission resources carries one or more transmission blocks included in the uplink data, the one or more transmission blocks being able to be separately decoded. As a result, the network device may separately interpret each transmission block. When the interpretation fails or data are not transmitted due to a failure of LBT detection, it only instructs the terminal equipment to retransmit or transmit the transmission blocks in the bandwidth unit again, and there is no need to retransmit data on all bandwidth units (such as the M1 scheduled bandwidth units in Embodiment 1), thereby further improving resource utilization and efficiency of data transmission.

In one implementation, a resource included in one scheduled bandwidth unit in the actual data transmission resources carries one or more code blocks included in the uplink data, the one or more code blocks may be separately decoded.

As a result, the network device may separately interpret each code block. When the interpretation fails or data are not transmitted due to a failure of LBT detection, it only instructs the terminal equipment to retransmit or transmit the code blocks in the bandwidth unit again, and there is no need to retransmit data on all bandwidth units (such as the M1 scheduled bandwidth units in Embodiment 1), thereby further improving resource utilization and efficiency of data transmission.

It can be seen from the above embodiment that the network device schedules the subcarrier cluster sets spaced apart in the frequency domain contained in the integer number of bandwidth units on a single carrier for transmitting the uplink data, thereby reducing activation and deactivation processes of multiple carriers, increasing flexibility of the scheduling while ensuring the throughput, efficiently improving utilization of radio resources, increasing the data transmission efficiency, and solving the problems in the related art.

Embodiment 2

Figure 4:
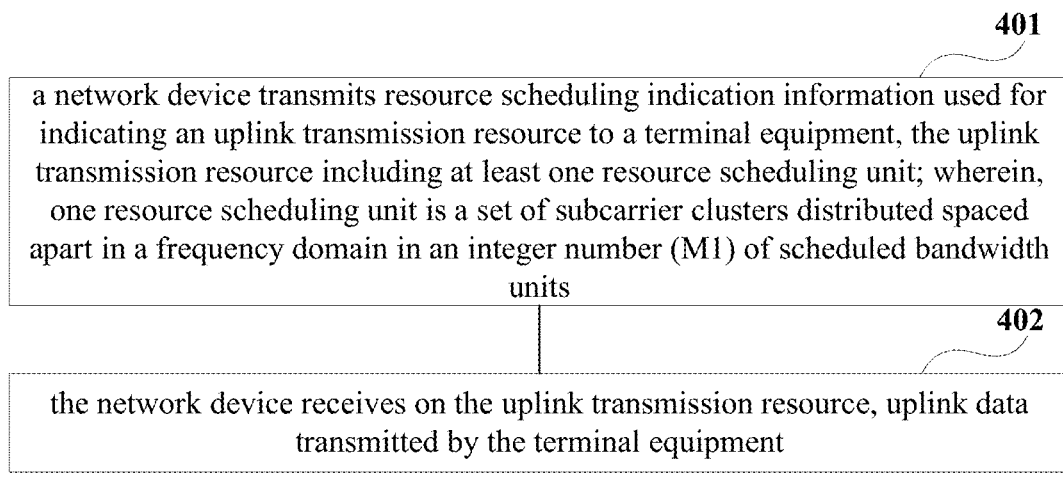

FIG. 4 is a flowchart of a resource indication method of Embodiment 2, applicable to a network device side. As shown in FIG. 4, the method includes:

step 401: a network device transmits resource scheduling indication information used for indicating an uplink transmission resource to a terminal equipment, the uplink transmission resource including at least one resource scheduling unit; wherein, one resource scheduling unit is a set of subcarrier clusters distributed spaced apart in a frequency domain in an integer number (M1) of scheduled bandwidth units; and step 402: the network device receives, on the uplink transmission resource, uplink data transmitted by the terminal equipment.

In this embodiment, implementations of steps 401 and 402 correspond to steps 201 and 202 in Embodiment 1, and reference may be made to Embodiment 1 for meanings of the bandwidth unit and the resource scheduling unit, which shall not be described herein any further.

In this embodiment, the integer number of scheduled bandwidth units are frequency-domain resources of an unlicensed frequency band, and the subcarrier clusters are resource blocks or an integer number of subcarriers.

In this embodiment, the resource scheduling indication information includes a resource allocation domain used for indicating the uplink transmission resource, the resource allocation domain including an index and/or the number of the at least one resource scheduling unit, and the resource scheduling indication information is carried by at least one piece of control information.

In one implementation, the integer number of scheduled bandwidth units include at least two resource scheduling units, and two subcarrier clusters having an interval of a first fixed value on the frequency-domain resources contained in the integer number of scheduled bandwidth units belong to the same resource scheduling unit; wherein subcarrier clusters contained in one resource scheduling unit are evenly distributed at equal intervals on frequency domain resources in the integer number of scheduled bandwidth units, and the interval is equal to the first fixed value, and at least two resource scheduling units contained in the integer number of scheduled bandwidth units are identified by indices, and indices of the at least two resource scheduling units are different. Reference may be made to FIG. 3A in Embodiment 1 for a particular mode of distribution, which shall not be described herein any further.

In this implementation, the resource scheduling indication information is carried by one piece of control information and includes one resource allocation domain, the resource allocation domain indicating scheduled resource scheduling units in the integer number of scheduled bandwidth units.

In one implementation, the subcarrier clusters contained in the one resource scheduling unit belong to one scheduled bandwidth unit, and each scheduled bandwidth unit includes at least two resource scheduling units; wherein two subcarrier clusters having an interval of a second fixed value on the frequency-domain resources contained in the one scheduled bandwidth unit belong to the same resource scheduling unit; and wherein subcarrier clusters contained in one resource scheduling unit are evenly distributed at equal intervals on one scheduled bandwidth unit, and the interval is equal to the second fixed value. The at least two resource scheduling units included in the one scheduled bandwidth unit are identified by indices, and indices of the at least two resource scheduling units are different. Reference may be made to FIG. 3B in Embodiment 1 for a particular mode of distribution, which shall not be described herein any further.

In this implementation, the resource scheduling indication information may be carried by one piece of control information and includes one resource allocation domain, the resource allocation domain indicating that resource scheduling units contained in each bandwidth unit in the integer number of scheduled bandwidth units corresponding to the index of the at least one resource scheduling unit that are scheduled, that is, for each bandwidth unit, if the bandwidth unit includes the resource scheduling unit of the index, the resource scheduling unit is scheduled, and if the bandwidth unit does not include the resource scheduling unit of the index, all the resource scheduling units on the bandwidth unit are not scheduled, i.e. indices contained in the resource allocation domain may determine resource scheduling of each bandwidth unit in the integer number of scheduled bandwidth units.

Or, in this implementation, the resource scheduling indication information is carried by one piece of control information and includes at least one resource allocation domain, the number of the at least one resource allocation domain being equal to the number of bandwidth units in the integer number of scheduled bandwidth units; wherein one resource allocation domain indicates resource scheduling units in one scheduled bandwidth unit.

Or, in this implementation, when the resource scheduling indication information is carried by at least one piece of control information, the number of the at least one piece of control information equal to the number of bandwidth units in the integer number of scheduled bandwidth units; wherein the resource scheduling indication information carried by one piece of control information indicates resource scheduling units in one scheduled bandwidth unit.

In this embodiment, reference may be made to Embodiment 1 for a particular implementation of the above resource scheduling indication information. The control information may be downlink control information (DCI), and reference may be made to Embodiment 1 for a particular example thereof, which shall not be described herein any further.

In this embodiment, before step 401, the method may further include (not shown):

the network device receives, resource configuration information transmitted by the terminal equipment, the resource configuration information being used to indicate one or more bandwidth units configured by the network device for the terminal equipment on a frequency carrier, the configured one or more bandwidth units including the integer number of scheduled bandwidth units.

In this embodiment, the configured one or more bandwidth units are allocation units of unlicensed frequency band resources.

In this embodiment, reference may be made to step S1 in Embodiment 1 for a particular implementation of the resource configuration information, which shall not be described herein any further.

In this embodiment, the network device may carry the resource configuration information via high-layer configuration signaling or broadcast information transmitted to the terminal equipment.

In this embodiment, the resource configuration information further includes configuration information of a frequency bandwidth, the frequency bandwidth including at least one configured bandwidth unit; wherein reference may be made to Embodiment 1 for a particular implementation of the configuration information of the frequency bandwidth, which shall not be described herein any further.

In this embodiment, the configured one or more bandwidth units are the integer number of scheduled bandwidth units, or the method may further include (not shown):

the network device transmits bandwidth unit indication information to the terminal equipment, the bandwidth unit indication information being used to indicate the integer number of scheduled bandwidth units in the configured one or more bandwidth units.

In this embodiment, the bandwidth unit indication information may be carried in at least one of RRC signaling, an MAC instruction and physical layer control information transmitted by the network device. Reference may be made to step S2 in Embodiment 1 for a particular implementation of the bandwidth unit indication information, which shall not be described herein any further.

In this embodiment, in step 402, the network device de-maps the received uplink data to obtain the uplink data. A rule for the de-mapping corresponds to the predetermined rule for mapping in Embodiment 1, which shall not be described herein any further.

It can be seen from the above embodiment that the network device schedules the subcarrier cluster sets spaced apart in the frequency domain contained in the integer number of bandwidth units on a single carrier for transmitting the uplink data, thereby reducing activation and deactivation processes of multiple carriers, increasing flexibility of the scheduling while ensuring the throughput, efficiently improving utilization of radio resources, increasing the data transmission efficiency, and solving the problems in the related art.

Embodiment 3

Figure 5:
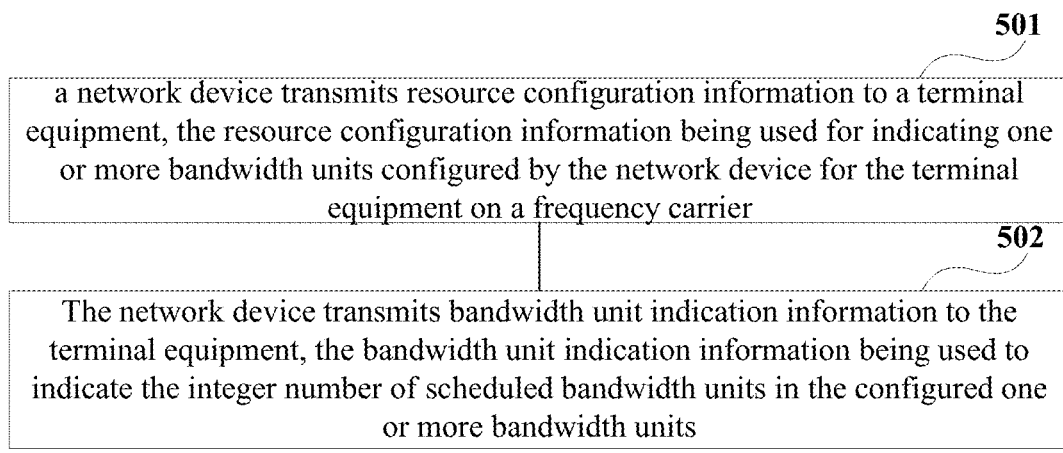

FIG. 5 is a flowchart of a resource indication method of Embodiment 3, applicable to a network device side. As shown in FIG. 5, the method includes:

step 501: a network device transmits resource configuration information by to a terminal equipment, the resource configuration information being used for indicating one or more bandwidth units configured by the network device for the terminal equipment on a frequency carrier.

In this embodiment, the configured one or more bandwidth units are allocation units of unlicensed frequency band resources, and reference may be made to Embodiment 1 for a particular meaning and implementation of the bandwidth unit.

In this embodiment, reference may be made to Embodiment 1 for a particular implementation of the resource configuration information, which shall not be described herein any further.

In this embodiment, the network device may carry the resource configuration information via high-layer configuration signaling or broadcast information transmitted to the terminal equipment.

In this embodiment, the network device may configure a transmission bandwidth for the terminal equipment by using the resource configuration information, the transmission bandwidth including one or more configured bandwidth units. The transmission bandwidth may be used for the terminal equipment to transmit uplink data, but it is not necessary that the entire transmission bandwidth is actually used to transmit uplink data. The network device may indicate in the transmission bandwidth a scheduling bandwidth actually scheduled by the terminal equipment. The scheduling bandwidth includes an integer number of scheduled bandwidth units, and allocates uplink transmission resources for transmitting uplink data on the scheduling bandwidth for the terminal equipment.

In this embodiment, in order to avoid in-band interference, a guard interval may be introduced between bandwidth units, that is, there exists no overlap between the scheduled bandwidth units, and there exists a guard interval at two sides of the scheduled bandwidth unit.

In this embodiment, a size of the guard interval is of a default value, or a size of the guard interval may be determined according to a size of a subcarrier interval in the bandwidth unit and/or a size of a bandwidth of the scheduled bandwidth unit as a predetermined size. When multiple bandwidth units are configured and it cannot be ensured that other transmission techniques do not exist, the network device and the terminal equipment may determine that there exists a guard interval at two sides of a bandwidth unit, and the transmission bandwidth or a frequency resource occupied by a resource block or subcarrier that is being scheduled does not contain a spectrum within the guard interval.

FIG. 6 is a schematic diagram of the guard period of this implementation. As shown in FIG. 6, the network device and the terminal equipment determine that there exists a guard interval at two sides of each bandwidth unit, a size of the guard interval being of a default value, or being determined according to a size of a subcarrier interval in the bandwidth unit and/or a size of a bandwidth of the scheduled bandwidth unit, and RBs contained in this section of bandwidth do not contain a guard interval frequency spectrum.

In this embodiment, the size of the guard interval may be of a frequency width value, or the size of the guard interval may be of an integer number of resource blocks or an integer number of subcarriers, that is, a unit of the guard interval is hertz, or resource block, or subcarrier.

In this embodiment, the method may further include (not shown): the network device transmits indication information indicating whether other transmission techniques coexist via high-layer signaling or system information.

In this embodiment, the configured one or more bandwidth units include the integer number of scheduled bandwidth units in Embodiment 1. That is, in one implementation, the configured one or more bandwidth units are the integer number of scheduled bandwidth units, after receiving the resource configuration information, the terminal equipment may directly determine the integer number of scheduled bandwidth units; in one implementation, the M1 scheduled bandwidth units are part or all of the bandwidth units in the M2 configured bandwidth units, which bandwidth units in the M2 configured bandwidth units are particularly taken as the M1 scheduled bandwidth units may be indicated by additional bandwidth unit indication information, and the terminal equipment may determine the integer number of scheduled bandwidth units by combining the resource configuration information with the bandwidth unit indication information.

Therefore, in this implementation, the method may further include:

step 502 (optional): the network device transmits bandwidth unit indication information to the terminal equipment, the bandwidth unit indication information being used to indicate the integer number of scheduled bandwidth units in the configured one or more bandwidth units.

In one implementation, the bandwidth unit indication information may include indices of the integer number of scheduled bandwidth units, or the bandwidth unit indication information is a bitmap corresponding to the number of the configured M2 bandwidth units, each bit indicating whether a corresponding configured bandwidth unit is a scheduled bandwidth unit, and reference may be made to Embodiment 1 for a particular example thereof, which shall not be described herein any further.

In another implementation, in order to indicate the scheduled bandwidth unit more conveniently, the configured M2 bandwidth units may also be divided into at least one frequency bandwidth, each frequency bandwidth including at least one configured bandwidth unit, and the bandwidth unit indication information indicates the scheduled bandwidth unit by indicating a frequency bandwidth index. In this implementation, the resource configuration information may further include configuration information of a frequency bandwidth, the frequency bandwidth including at least one configured bandwidth unit. In this implementation, reference may be made to Embodiment 1 for a particular implementation of the configuration information of a frequency bandwidth, which shall not be described herein any further.

In this implementation, the bandwidth unit indication information may include an index of the frequency bandwidth, thereby indicating that at least one configured bandwidth unit included in the frequency bandwidth identified by the index is a scheduled bandwidth unit.

In this embodiment, at least one of radio resource control (RRC) signaling, medium access control (MAC) signaling and physical layer control information transmitted by the network device includes the bandwidth unit indication information.

In this embodiment, the method may further include (not shown): the network device transmits resource scheduling indication information to the terminal equipment, and receives uplink transmission data transmitted by the terminal equipment. Reference may be made to steps 401 and 402 in Embodiment 2 for a particular implementation thereof, which shall not be described herein any further.

In this implementation, the method may further include (optional, not shown): the network device performs channel monitoring (listen-before-talk, LBT) by, determines a bandwidth unit that may be used to transmit and receive data according to a monitoring result, and schedules uplink and downlink data on the transmission resources in the bandwidth unit that may be used to transmit and receive data. Reference may be made to Embodiment 1 for a particular implementation of the LBT, which shall not be described herein any further.

It can be seen from the above embodiment that the network device configures one or more bandwidth units for the terminal equipment in advance, and indicates the scheduled bandwidth unit in the above configured bandwidth units. Therefore, by scheduling the subcarrier cluster sets spaced apart in the frequency domain contained in the integer number of bandwidth units on a single carrier for transmitting uplink data, activation and deactivation processes of multiple carriers may be reduced, flexibility of the scheduling may be increased while ensuring the throughput, utilization of radio resources may be efficiently improved, the data transmission efficiency may be increased, and the problems in the related art may be solved.

Furthermore, by mode of adaptively adjusting the transmission bandwidth according to the results of channel monitoring. Due to the listen-before-talk rule of an unlicensed frequency band, an actual data transmission bandwidth in case of large bandwidth transmission needs to be determined according to LBT monitoring results. By introducing the guard interval at both sides of the bandwidth unit in the above embodiment, in-band interference in an actual transmission bandwidth may be efficiently avoided, a rate of success of data decoding may be improved, and transmission efficiency may further be improved.

Embodiment 4

FIG. 7 is a flowchart of a resource indication method of Embodiment 4, applicable to a terminal equipment side. As shown in FIG. 7, the method includes:

step 701: a terminal equipment receives, resource configuration information transmitted by a network device, the resource configuration information being used for indicating one or more bandwidth units configured by the network device for the terminal equipment on a frequency carrier.

In this embodiment, the configured one or more bandwidth units are allocation units of unlicensed frequency band resources, and reference may be made to Embodiment 1 for a particular meaning and implementation of the bandwidth unit.

In this embodiment, reference may be made to Embodiment 1 for a particular implementation of the resource configuration information, which shall not be described herein any further.

In this embodiment, the terminal equipment may obtain the resource configuration information via high-layer configuration signaling or broadcast information transmitted by the network device.

In this embodiment, the network device may configure a transmission bandwidth for the terminal equipment by using the resource configuration information, the transmission bandwidth including one or more configured bandwidth units. The transmission bandwidth may be used for the terminal equipment to transmit uplink data, but it is not necessary that the entire transmission bandwidth is actually used to transmit uplink data. The network device may indicate in the transmission bandwidth a scheduling bandwidth actually scheduled by the terminal equipment. The scheduling unit includes an integer number of scheduled bandwidth units, and allocates uplink transmission resources for transmitting uplink data on the scheduling bandwidth for the terminal equipment.

In this embodiment, in order to avoid in-band interference, a guard interval may be introduced between bandwidth units, that is, there exists no overlap between the integer number of scheduled bandwidth units, and there exists a guard interval at two sides of the scheduled bandwidth unit. Reference may be made to Embodiment 3 for a particular implementation of the guard interval, which shall not be described herein any further.

In this embodiment, the method may further include (optional, not shown): the terminal equipment obtains indication information indicating whether other transmission techniques coexist transmitted by the network device via high-layer signaling or system information.

In this embodiment, the configured one or more bandwidth units include the integer number of scheduled bandwidth units in Embodiment 1. That is, in one implementation, the configured one or more bandwidth units are the integer number of scheduled bandwidth units, after receiving the resource configuration information, the terminal equipment may directly determine the integer number of scheduled bandwidth units; in one implementation, the M1 scheduled bandwidth units are part or all of the bandwidth units in the M2 configured bandwidth units, which bandwidth units in the M2 configured bandwidth units are particularly taken as the M1 scheduled bandwidth units may be indicated by additional bandwidth unit indication information, and the terminal equipment may determine the integer number of scheduled bandwidth units by combining the resource configuration information with the bandwidth unit indication information.

Therefore, in this implementation, the method may further include:

step 702 (optional): the terminal equipment receives, bandwidth unit indication information transmitted by the network device, the bandwidth unit indication information being used to indicate the integer number of scheduled bandwidth units in the configured one or more bandwidth units. Reference may be made to step 502 in Embodiment 3 for an implementation of step 702, which shall not be described herein any further.

In this embodiment, the method may further include (optional, not shown): the terminal equipment receives resource scheduling indication information transmitted by the network device, and transmits uplink transmission data to the network device. Reference may be made to steps 201 and 202 in Embodiment 1 for a particular implementation thereof, which shall not be described herein any further.

In this implementation, before the terminal equipment transmits the uplink transmission data, the method may further include (optional, not shown): the terminal equipment performs channel monitoring (listen-before-talk, LBT). Reference may be made to Embodiment 1 for a particular implementation of the monitoring, which shall not be described herein any further.

In this embodiment, the resource configuration information may further include indication information indicating whether to perform LBT detection, or indication information indicating via other information whether to perform LBT detection.

It can be seen from the above embodiment that the network device configures one or more bandwidth units for the terminal equipment in advance, and indicates the scheduled bandwidth unit in the above configured bandwidth units. Therefore, by scheduling the subcarrier cluster sets spaced apart in the frequency domain contained in the integer number of bandwidth units on a single carrier for transmitting uplink data, activation and deactivation processes of multiple carriers may be reduced, flexibility of the scheduling may be increased while ensuring the throughput, utilization of radio resources may be efficiently improved, the data transmission efficiency may be increased, and the problems in the related art may be solved.

Furthermore, by the mode of adaptively adjusting the transmission bandwidth according to the results of channel monitoring. Due to the listen-before-talk rule of an unlicensed frequency band, an actual data transmission bandwidth in case of large bandwidth transmission needs to be determined according to LBT monitoring results. By introducing the guard interval at both sides of the bandwidth unit in the above embodiment, in-band interference in an actual transmission bandwidth may be efficiently avoided, a rate of success of data decoding may be improved, and transmission efficiency may further be improved.

It should be noted that at the network device side, above embodiments 2 and 3 may be implemented in a combined manner or may be implemented separately. And at the terminal equipment side, above embodiments 1 and 4 may be implemented in a combined manner or may be implemented separately, and this embodiment is not limited thereto.

Figure 8:
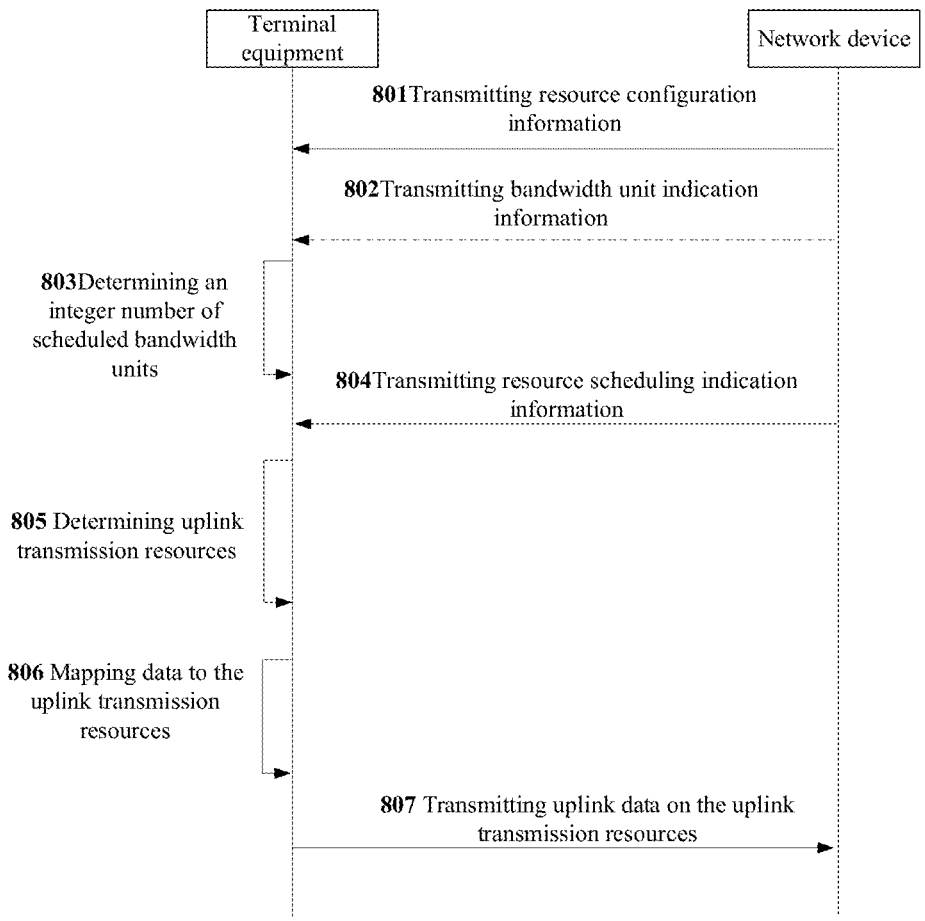

A data transmission method is provided below, which is shown in FIG. 8. The contents on embodiments 1-4 are incorporated in this method. FIG. 8 is a flowchart of the data transmission method. As shown in FIG. 8, the method includes:

step 801: the network device transmits resource configuration information to the terminal equipment;

step 802 (optional): the network device transmits bandwidth unit indication information e to the terminal equipment;

step 803: the terminal equipment determines an integer number of scheduled bandwidth units according to the resource configuration information or in conjunction with the resource configuration information and bandwidth unit indication information;

step 804: the network device transmits resource scheduling indication information to the terminal equipment;

step 805: the terminal equipment determines uplink transmission resources according to the resource scheduling indication information;

step 806: the terminal equipment maps transmitted uplink data to the uplink transmission resources according to a predetermined rule; and step 807: the terminal equipment transmits uplink data by the terminal equipment on the uplink transmission resources.

Reference may be made to embodiments 1-4 for particular implementations of steps 801-807, which shall not be described herein any further. It should be noted that before step 807, the method may further include (not shown): the terminal equipment performs monitoring, and determines a bandwidth unit available for transmitting data according to a result or monitoring. In steps 806-807, the terminal equipment determines actual data transmission resources according to the bandwidth unit available for transmitting data, maps the uplink data to the actual transmission resources, and transmits the uplink data. Reference may be made to Embodiment 1 for a particular implementation of the monitoring and a method for determining the actual transmission resources, which shall not be described herein any further.

Embodiment 5

Embodiment 5 provides a resource scheduling indication apparatus. As a principle of the apparatus for solving problems is similar to that of the method in Embodiment 1, reference may be made to the implementation of the method in Embodiment 1 for implementation of this apparatus, with identical contents being going to be described herein any further.

Figure 9:
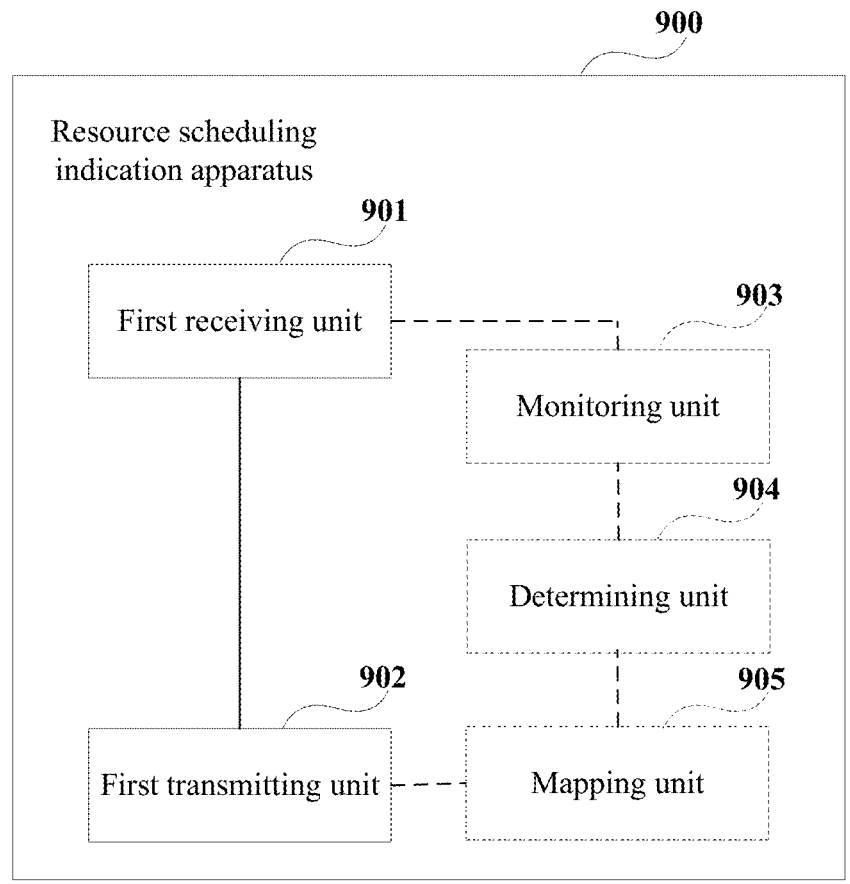

FIG. 9 is a schematic diagram of a structure of the resource scheduling indication apparatus of Embodiment 5. As shown in FIG. 9, a resource scheduling indication apparatus 900 includes:

a first receiving unit 901 configured to receive resource scheduling indication information transmitted by a network device and used for indicating an uplink transmission resource, the uplink transmission resource including at least one resource scheduling unit; wherein one resource scheduling unit is a set of subcarrier clusters distributed spaced apart in a frequency domain in an integer number of scheduled bandwidth units; and a first transmitting unit 902 configured to transmit uplink data on the uplink transmission resource.

In this embodiment, reference may be made to steps 201-202 in Embodiment 1 for implementations of the first receiving unit 901 and first transmitting unit 902, which shall not be described herein any further.

In this embodiment, reference may be made to Embodiment 1 for meanings and implementations of the bandwidth unit, resource scheduling unit and uplink transmission resource, which shall not be described herein any further.

In this embodiment, the apparatus may further include:

a monitoring unit 903 (optional) configured to perform channel monitoring before transmitting uplink data; and a determining unit 904 (optional) configured to determine a bandwidth unit in the integer number of scheduled bandwidth units that are available for transmitting data according to channel monitoring result, the first transmitting unit transmitting the uplink data on overlapped actual data transmission resources of the bandwidth units that are available for transmitting data and the uplink transmission resources.

In this embodiment, the apparatus may further include:

a mapping unit 905 (optional) configured to map the uplink data onto the actual data transmission resources according to a predetermined rule; wherein, reference may be made to Embodiment 1 for the predetermined rule, which shall not be described herein any further.

In this embodiment, reference may be made to Embodiment 1 for implementations of the monitoring unit 903, determining unit 904 and mapping unit 905, which shall not be described herein any further.

In this embodiment, there exists a guard interval at two sides of the scheduled bandwidth unit, a size of the guard interval being of a default value, or a size of the guard interval being of a predetermined size, the predetermined size being determined according to a size of a subcarrier interval in the bandwidth unit and/or a size of a bandwidth of the scheduled bandwidth unit; and a unit of the guard interval is hertz, or resource block, or subcarrier.

In this embodiment, the apparatus may further include:

a third receiving unit (optional, not shown) configured to receive resource configuration information transmitted by the network device, reference being able to be made to step S1 in Embodiment 1 for a particular implementation thereof, which shall not be described herein any further.

In this embodiment, the apparatus may further include:

a fourth receiving unit (optional, not shown) configured to receive bandwidth unit indication information transmitted by the network device, reference being able to be made to step S2 in Embodiment 1 for a particular implementation thereof, which shall not be described herein any further.

It can be seen from the above embodiment that the network device schedules the subcarrier cluster sets spaced apart in the frequency domain contained in the integer number of bandwidth units on a single carrier for transmitting uplink data, thereby reducing activation and deactivation processes of multiple carriers, increasing flexibility of the scheduling while ensuring the throughput, efficiently improving utilization of radio resources, increasing the data transmission efficiency, and solving the problems in the related art.

Embodiment 6

Embodiment 6 provides a resource indication apparatus. As a principle of the apparatus for solving problems is similar to that of the method in Embodiment 3, reference may be made to the implementation of the method in Embodiment 3 for implementation of this apparatus, with identical contents being going to be described herein any further.

Figure 10:
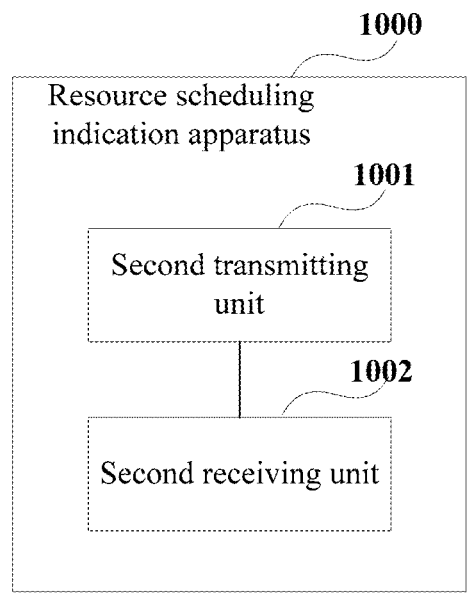

FIG. 10 is a schematic diagram of a structure of the resource scheduling indication apparatus of the embodiment of this disclosure. As shown in FIG. 10, the resource scheduling indication apparatus 1000 includes:

a second transmitting unit 1001 configured to transmit resource scheduling indication information used for indicating an uplink transmission resource to a terminal equipment, the uplink transmission resource including at least one resource scheduling unit; wherein, one resource scheduling unit is a set of subcarrier clusters distributed spaced apart in a frequency domain in an integer number of scheduled bandwidth units; and a second receiving unit 1002 configured to, on the uplink transmission resource, receive uplink data transmitted by the terminal equipment.

In this embodiment, reference may be made to steps 401-402 in Embodiment 2 for implementations of the second transmitting unit 1001 and second receiving unit 1002, which shall not be described herein any further.

In this embodiment, reference may be made to Embodiment 1 for meanings and implementations of the bandwidth unit, resource scheduling unit and uplink transmission resource, which shall not be described herein any further.

In this embodiment, the apparatus may further include (optional, not shown): a processing unit configured to perform channel monitoring and data de-mapping, reference being able to be made to Embodiment 2 for a particular implementation thereof, which shall not be described herein any further.

In this embodiment, there exists a guard interval at two sides of the scheduled bandwidth unit, a size of the guard interval being of a default value, or a size of the guard interval being of a predetermined size, the predetermined size being determined according to a size of a subcarrier interval in the bandwidth unit and/or a size of a bandwidth of the scheduled bandwidth unit; and a unit of the guard interval is hertz, or resource block, or subcarrier.

In this embodiment, the apparatus may further include:

a third transmitting unit (optional, not shown) configured to transmit resource configuration information transmitted to the terminal equipment, reference being able to be made to Embodiment 1 for a particular implementation thereof, which shall not be described herein any further.

In this embodiment, the apparatus may further include:

a fourth transmitting unit (optional, not shown) configured to transmit bandwidth unit indication information to the terminal equipment, reference being able to be made to Embodiment 1 for a particular implementation thereof, which shall not be described herein any further.

It can be seen from the above embodiment that the network device schedules the subcarrier cluster sets spaced apart in the frequency domain contained in the integer number of bandwidth units on a single carrier for transmitting uplink data, thereby reducing activation and deactivation processes of multiple carriers, increasing flexibility of the scheduling while ensuring the throughput, efficiently improving utilization of radio resources, increasing the data transmission efficiency, and solving the problems in the related art.

Embodiment 7

Embodiment 7 provides a resource indication apparatus. As a principle of the apparatus for solving problems is similar to that of the method in Embodiment 3, reference may be made to the implementation of the method in Embodiment 3 for implementation of this apparatus, with identical contents being going to be described herein any further.

Figure 11:
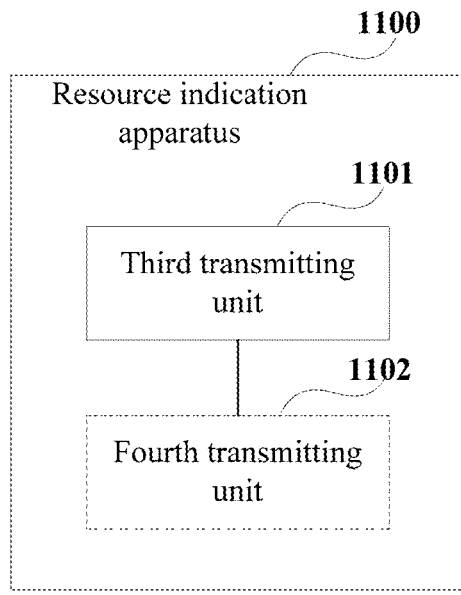

FIG. 11 is a schematic diagram of a structure of the resource indication apparatus of Embodiment 7. As shown in FIG. 11, a resource indication apparatus 1100 includes:

a third transmitting unit 1101 configured to transmit resource configuration information to a terminal equipment, the resource configuration information being used for indicating one or more bandwidth units on a frequency carrier configured by a network device for the terminal equipment.

In this embodiment, the apparatus may further include:

a fourth transmitting unit 1102 (optional) configured to transmit bandwidth unit indication information to the terminal equipment, the bandwidth unit indication information being used for indicating the integer number of scheduled bandwidth units in the configured one or more bandwidth units.

In this embodiment, reference may be made to steps 501-502 in Embodiment 3 for implementations of the third transmitting unit 1101 and fourth transmitting unit 1102, which shall not be described herein any further.

It can be seen from the above embodiment that the network device configures one or more bandwidth units for the terminal equipment in advance, and indicates the scheduled bandwidth unit in the above configured bandwidth units. Therefore, by scheduling the subcarrier cluster sets spaced apart in the frequency domain contained in the integer number of bandwidth units on a single carrier for transmitting uplink data, activation and deactivation processes of multiple carriers may be reduced, flexibility of the scheduling may be increased while ensuring the throughput, utilization of radio resources may be efficiently improved, the data transmission efficiency may be increased, and the problems in the related art may be solved.

Embodiment 8

Embodiment 8 provides a resource indication apparatus. As a principle of the apparatus for solving problems is similar to that of the method in Embodiment 4, reference may be made to the implementation of the method in Embodiment 4 for implementation of this apparatus, with identical contents being going to be described herein any further.

FIG. 12 is a schematic diagram of a structure of the resource indication apparatus of the embodiment of this disclosure. As shown in FIG. 12, a resource indication apparatus 1200 includes:

a third receiving unit 1201 configured to receive resource configuration information transmitted by a network device, the resource configuration information being used for indicating one or more bandwidth units on a frequency carrier configured by the network device for a terminal equipment.

In this embodiment, the apparatus may further include:

a fourth receiving unit 1202 (optional) configured to receive bandwidth unit indication information transmitted by the network device, the bandwidth unit indication information being used for indicating an integer number of scheduled bandwidth units in the configured one or more bandwidth units.

In this embodiment, reference may be made to steps 701-702 in Embodiment 4 for implementations of the third receiving unit 1201 and fourth receiving unit 1202, which shall not be described herein any further.

In this embodiment, the apparatus may further include: a bandwidth determining unit (not shown) configured to determine the integer number of scheduled bandwidth units according to the resource configuration information or according to the resource configuration information and the bandwidth unit indication information, reference being able to be made to Embodiment 1 for a particular implementation thereof, which shall not be described herein any further.

It can be seen from the above embodiment that the network device configures one or more bandwidth units for the terminal equipment in advance, and indicates the scheduled bandwidth unit in the above configured bandwidth units. Therefore, by scheduling the subcarrier cluster sets spaced apart in the frequency domain contained in the integer number of bandwidth units on a single carrier for transmitting uplink data, activation and deactivation processes of multiple carriers may be reduced, flexibility of the scheduling may be increased while ensuring the throughput, utilization of radio resources may be efficiently improved, the data transmission efficiency may be increased, and the problems in the related art may be solved.

Embodiment 9

This embodiment provides a communication system, and reference may be made to FIG. 1, with contents identical to those in embodiments 1-8 being not going to be described herein any further. In this embodiment, the communication system 100 may include:

a network device 101 configured with the resource scheduling indication apparatus 1000 as described in Embodiment 6 or the resource indication apparatus 1100 as described in Embodiment 7; and a terminal equipment 102 configured with the resource scheduling indication apparatus 900 as described in Embodiment 5 or the resource indication apparatus 1200 as described in Embodiment 8.

This embodiment further provides a network device, which may be, for example, a base station. However, this disclosure is not limited thereto, and it may also be another network device.

FIG. 13 is a schematic diagram of a structure of the network device of the embodiment of this disclosure. As shown in FIG. 13, a network device 1300 may include a processor 1310 (such as a central processing unit (CPU)) and a memory 1320, the memory 1320 being coupled to the processor 1310. The memory 1320 may store various data, and furthermore, it may store a program 1330 for data processing, and execute the program 1330 under control of the processor 1310.

For example, the processor 1310 may be configured to execute the program 1330 to carry out the resource scheduling indication method described in Embodiment 2. For example, the processor 1310 may be configured to execute the following control: transmit resource scheduling indication information used for indicating an uplink transmission resource to the terminal equipment, the uplink transmission resource including at least one resource scheduling unit; wherein, one resource scheduling unit is a set of subcarrier clusters distributed spaced apart in a frequency domain in an integer number of scheduled bandwidth units; and receive on the uplink transmission resource, uplink data transmitted by the terminal equipment.

For another example, the processor 1310 may be configured to execute the program 1330 to carry out the resource indication method described in Embodiment 3. For example, the processor 1310 may be configured to execute the following control: transmit resource configuration information to the terminal equipment, the resource configuration information being used for indicating one or more bandwidth units configured by the network device for the terminal equipment on a frequency carrier.

Furthermore, as shown in FIG. 13, the network device 1300 may include a transceiver 1340, and an antenna 1350, etc. Functions of the above components are similar to those in the related art, and shall not be described herein any further. It should be noted that the network device 1300 does not necessarily include all the parts shown in FIG. 13, and furthermore, the network device 1300 may include parts not shown in FIG. 13, and the related art may be referred to.

The embodiment of this disclosure further provides a terminal equipment, however, this disclosure is not limited thereto, and it may also be another equipment.

FIG. 14 is a schematic diagram of the terminal equipment of the embodiment of this disclosure. As shown in FIG. 14, a terminal equipment 1400 may include a processor 1410 and a memory 1420, the memory 1420 storing data and a program and being coupled to the processor 1410. It should be noted that his figure is illustrative only, and other types of structures may also be used, so as to supplement or replace this structure and achieve a telecommunications function or other functions.

For example, the processor 1410 may be configured to execute a program to carry out the resource scheduling indication method described in Embodiment 1. For example, the processor 1410 may be configured to execute the following control: receive resource scheduling indication information transmitted by a network device and used for indicating an uplink transmission resource, the uplink transmission resource including at least one resource scheduling unit; wherein one resource scheduling unit is a set of subcarrier clusters distributed spaced apart in a frequency domain in an integer number (M1) of scheduled bandwidth units; and transmit uplink data on the uplink transmission resource.

For another example, the processor 1410 may be configured to execute the program to carry out the resource indication method described in Embodiment 4. For example, the processor 1410 may be configured to execute the following control: receive resource configuration information transmitted by the network device, the resource configuration information being used for indicating one or more bandwidth units configured by the network device for the terminal equipment on a frequency carrier.

As shown in FIG. 14, the terminal equipment 1400 may further include a communication module 1430, an input unit 1440, a display 1450, and a power supply 1460; wherein functions of the above components are similar to those in the related art, which shall not be described herein any further. It should be noted that the terminal equipment 1400 does not necessarily include all the parts shown in FIG. 14, and the above components are not necessary. Furthermore, the terminal equipment 1400 may include parts not shown in FIG. 14, and the related art may be referred to.

An embodiment of this disclosure provides a computer storage medium, including a computer readable program code, which will cause a resource scheduling indication apparatus or a terminal equipment to carry out the resource scheduling indication method described in Embodiment 1.

An embodiment of the present disclosure provides a computer readable program code, which, when executed in a resource scheduling indication apparatus or a terminal equipment, will cause the resource scheduling indication apparatus or the terminal equipment to carry out the resource scheduling indication method described in Embodiment 1.

An embodiment of this disclosure provides a computer storage medium, including a computer readable program code, which will cause a resource scheduling indication apparatus or a network device to carry out the resource scheduling indication method described in Embodiment 2.

An embodiment of the present disclosure provides a computer readable program code, which, when executed in a resource scheduling indication apparatus or a network device, will cause the resource scheduling indication apparatus or the network device to carry out the resource scheduling indication method described in Embodiment 2.

An embodiment of this disclosure provides a computer storage medium, including a computer readable program code, which will cause a resource indication apparatus or a network device to carry out the resource indication method described in Embodiment 3.

An embodiment of the present disclosure provides a computer readable program code, which, when executed in a resource indication apparatus or a network device, will cause the resource indication apparatus or the network device to carry out the resource indication method described in Embodiment 3.

An embodiment of this disclosure provides a computer storage medium, including a computer readable program code, which will cause a resource indication apparatus or a terminal equipment to carry out the resource indication method described in Embodiment 4.

An embodiment of the present disclosure provides a computer readable program code, which, when executed in a resource indication apparatus or a terminal equipment, will cause the resource indication apparatus or the terminal equipment to carry out the resource indication method described in Embodiment 4.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 9-14 may either correspond to software modules of procedures of a computer program, or correspond to hardware modules. Such software modules may respectively correspond to the steps shown in FIGS. 2-8. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 9-14 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 9-14 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

SUPPLEMENTS

1. A resource scheduling indication method, wherein the method includes:

receiving, by a terminal equipment, resource scheduling indication information transmitted by a network device and used for indicating an uplink transmission resource, the uplink transmission resource including at least one resource scheduling unit; wherein one resource scheduling unit is a set of subcarrier clusters distributed spaced apart in a frequency domain in an integer number (M1) of scheduled bandwidth units; and transmitting uplink data on the uplink transmission resource by the terminal equipment.

2. The method according to supplement 1, wherein the integer number of scheduled bandwidth units are frequency-domain resources on a frequency carrier of an unlicensed frequency band, the number of resource blocks contained in the scheduled bandwidth units being equal to a first value, the first value being the number of resource blocks contained in an integer number of 20 MHz bandwidth resources.

3. The method according to supplement 1 or 2, wherein the subcarrier clusters are resource blocks, or an integer number of subcarriers.

4. The method according to supplement 1 or 2 or 3, wherein the resource scheduling indication information includes a resource allocation domain used for indicating the uplink transmission resource, the resource allocation domain including an index and/or the number of the at least one resource scheduling unit.

5. The method according to any one of supplements 1-4, wherein the integer number of scheduled bandwidth units include at least two resource scheduling units, and two subcarrier clusters having an interval of a first fixed value on frequency-domain resources contained in the integer number of scheduled bandwidth units belong to the same resource scheduling unit.

6. The method according to supplement 5, wherein the resource scheduling units in the integer number of scheduled bandwidth units are identified by indices, and indices of the at least two resource scheduling units are different.

7. The method according to supplement 5 or 6, wherein the resource scheduling indication information is carried by one piece of control information and includes one resource allocation domain, the resource allocation domain indicating scheduled resource scheduling units in the integer number of scheduled bandwidth units.

8. The method according to any one of supplements 1-4, wherein the subcarrier clusters contained in the one resource scheduling unit belong to one bandwidth unit, and each scheduled bandwidth unit includes at least two resource scheduling units; wherein two subcarrier clusters having an interval of a second fixed value on the frequency-domain resources contained in the one scheduled bandwidth unit belong to the same resource scheduling unit.

9. The method according to supplement 8, wherein the resource scheduling units included in one scheduled bandwidth unit are identified by indices, and indices of the at least two resource scheduling units are different.

10. The method according to supplement 8 or 9, wherein the resource scheduling indication information is carried by one piece of control information and includes one resource allocation domain, the resource allocation domain indicating that resource scheduling units contained in each bandwidth unit in the integer number of scheduled bandwidth units corresponding to the index of the at least one resource scheduling unit that are scheduled.

11. The method according to supplement 8 or 9, wherein the resource scheduling indication information is carried by one piece of control information and includes at least one resource allocation domain, the number of the at least one resource allocation domain being equal to the number of the bandwidth units contained in the integer number of scheduled bandwidth units; wherein one resource allocation domain indicates scheduled resource scheduling units in one scheduled bandwidth unit.

12. The method according to supplement 8 or 9, wherein when the resource scheduling indication information is carried by at least one piece of control information, the number of the at least one piece of control information is equal to the number of the bandwidth units contained in the integer number of scheduled bandwidth units; wherein one piece of resource scheduling indication information carried by one piece of control information indicates scheduled resource scheduling units in one scheduled bandwidth unit.

13. The method according to any one of supplements 1-12, wherein the method further includes:
detecting the resource scheduling indication information by the terminal equipment on at least one of the following resources: frequency domain resources of the integer number of scheduled bandwidth units, frequency domain resources of one bandwidth unit in the integer number of scheduled bandwidth units, and frequency domain resources of each bandwidth unit in the integer number of scheduled bandwidth units.

14. The method according to any one of supplements 1-13, wherein the method further includes:
receiving by the terminal equipment, resource configuration information transmitted by the network device, the resource configuration information being used to indicate one or more bandwidth units configured by the network device for the terminal equipment on a frequency carrier, the configured one or more bandwidth units including the integer number of scheduled bandwidth units.

15. The method according to supplement 14, wherein the configured one or more bandwidth units are allocation units of unlicensed frequency band resources.

16. The method according to supplement 14 or 15, wherein the number of resource blocks included in the configured bandwidth units is equal to a first value, the first value being the number of resource blocks included in an integer number of 20 MHz bandwidth resources.

17. The method according to supplement 15 or 16, wherein the resource configuration information includes position information and/or size information of the configured one or more bandwidth units.

18. The method according to supplement 17, wherein the position information includes a sequence number of a first or last resource block included in the configured bandwidth unit, and the size information includes the number of resource blocks included in the configured bandwidth unit.

19. The method according to any one of supplements 14-18, wherein the terminal equipment obtains the resource configuration information via high-layer configuration signaling or broadcast information transmitted by the network device.

20. The method according to any one of supplements 14-19, wherein the resource configuration information further includes configuration information of a frequency bandwidth, the frequency bandwidth including at least one configured bandwidth unit.

21. The method according to supplement 20, wherein the configuration information of the frequency bandwidth includes an index value of a bandwidth unit configured in each frequency bandwidth in the at least one frequency bandwidth, and/or the number of bandwidth units configured in each frequency bandwidth in the at least one frequency bandwidth.

22. The method according to any one of supplements 14-21, wherein the configured one or more bandwidth units are the integer number of scheduled bandwidth units, or the method further includes:
receiving, by the terminal equipment, bandwidth unit indication information transmitted by the network device, the bandwidth unit indication information being used for indicating the integer number of scheduled bandwidth units in the configured one or more bandwidth units.

23. The method according to supplement 22, wherein the terminal equipment obtains the bandwidth unit indication information via RRC signaling or MAC instruction transmitted by the network device.

24. The method according to supplement 22, the terminal equipment obtains the bandwidth unit indication information via physical layer control information transmitted by the network device.

25. The method according to any one of supplements 22-24, wherein the bandwidth unit indication information includes an index of the configured bandwidth unit, or includes an index of the frequency bandwidth, or includes a bitmap corresponding to the number of the configured one or more bandwidth units, each bit of the bitmap indicating whether a corresponding configured bandwidth unit is a scheduled bandwidth unit.

26. The method according to any one of supplements 1-25, wherein the method further includes:
performing channel monitoring by the terminal equipment before transmitting uplink data, wherein a unit of channel monitoring is the bandwidth unit.

27. The method according to supplement 26, wherein the method further includes:
determining by the terminal equipment bandwidth units in the integer number of scheduled bandwidth units that are available for transmitting data according to channel monitoring result, and transmitting the uplink data by the terminal equipment on overlapped actual data transmission resources of the bandwidth units that are available for transmitting data and the uplink transmission resources.

28. The method according to any one of supplements 1-27, wherein there exists no overlap between the bandwidth units contained in the integer number of scheduled bandwidth units, and there exists a guard interval at two sides of the scheduled bandwidth unit.

29. The method according to supplement 28, wherein a size of the guard interval is of a default value, or a size of the guard interval is of a predetermined size, the predetermined size being determined according to a size of a subcarrier interval in the scheduled bandwidth unit and/or a size of a bandwidth of the scheduled bandwidth unit.

30. The method according to supplement 29, wherein a unit of the guard interval is hertz, or resource block, or subcarrier.

31. The method according to any one of supplements 27-30, wherein the method further includes:
mapping the uplink data onto the actual data transmission resources by the terminal equipment according to a predetermined rule; wherein, the predetermined rule is that,
the uplink data are mapped in a sequential order of the frequency domain and the time domain onto resources in one scheduled bandwidth unit in the actual data transmission resources overlapping with the uplink transmission resources, and then mapped in a sequential order of the frequency domain and the time domain onto resources in next one scheduled bandwidth unit in the actual data transmission resources overlapping with the uplink transmission resources.

32. The method according to any one of supplements 27-31, wherein a resource included in a scheduled bandwidth unit in the actual data transmission resources carries one or more code blocks included in the uplink data, the one or more code blocks being able to be separately decoded.

33. The method according to any one of supplements 1-31, wherein a resource included in a scheduled bandwidth unit in the actual data transmission resources carries one or more code blocks included in the uplink data, the one or more code blocks being able to be separately decoded.

34. A resource scheduling indication method, wherein the method includes:
transmitting resource scheduling indication information used for indicating an uplink transmission resource by a network device to a terminal equipment, the uplink transmission resource including at least one resource scheduling unit; wherein one resource scheduling unit is a set of subcarrier clusters distributed spaced apart in a frequency domain in an integer number of scheduled bandwidth units; and
receiving, by the network device on the uplink transmission resource, uplink data transmitted by the terminal equipment.

35. The method according to supplement 34, wherein the integer number of scheduled bandwidth units are frequency-domain resources on a frequency carrier of an unlicensed frequency band, the number of resource blocks contained in the scheduled bandwidth units being equal to a first value, the first value being the number of resource blocks contained in an integer number of 20 MHz bandwidth resources.

36. The method according to supplement 34 or 35, wherein the subcarrier clusters are resource blocks, or an integer number of subcarriers.

37. The method according to any one of supplements 34-36, wherein the resource scheduling indication information includes a resource allocation domain used for indicating the uplink transmission resource, the resource allocation domain including an index and/or the number of the at least one resource scheduling unit.

38. The method according to any one of supplements 34-37, wherein the integer number of scheduled bandwidth units include at least two resource scheduling units, and two subcarrier clusters having an interval of a first fixed value on frequency-domain resources contained in the integer number of scheduled bandwidth units belong to the same resource scheduling unit.

39. The method according to supplement 38, wherein the resource scheduling units in the integer number of scheduled bandwidth units are identified by indices, and indices of the at least two resource scheduling units are different.

40. The method according to supplement 38 or 39, wherein the resource scheduling indication information is carried by one piece of control information and includes one resource allocation domain, the resource allocation domain indicating scheduled resource scheduling units in the integer number of scheduled bandwidth units.

41. The method according to any one of supplements 34-37, wherein the subcarrier clusters contained in the one resource scheduling unit belong to one bandwidth unit, and each scheduled bandwidth unit includes at least two resource scheduling units; wherein two subcarrier clusters having an interval of a second fixed value on the frequency-domain resources contained in the one scheduled bandwidth unit belong to the same resource scheduling unit.

42. The method according to supplement 41, wherein the resource scheduling units included in the one scheduled bandwidth unit are identified by indices, and indices of the at least two resource scheduling units are different.

43. The method according to supplement 41 or 42, wherein the resource scheduling indication information is carried by one piece of control information and includes one resource allocation domain, the resource allocation domain indicating that resource scheduling units contained in each bandwidth unit in the integer number of scheduled bandwidth units corresponding to the index of the at least one resource scheduling unit that are scheduled.

44. The method according to supplement 41 or 42, wherein the resource scheduling indication information is carried by one piece of control information and includes at least one resource allocation domain, the number of the at least one resource allocation domain being equal to the number of the bandwidth units contained in the integer number of scheduled bandwidth units; wherein one resource allocation domain indicates scheduled resource scheduling units in one scheduled bandwidth unit.

45. The method according to supplement 41 or 42, wherein when the resource scheduling indication information is carried by at least one piece of control information, the number of the at least one piece of control information is equal to the number of the bandwidth units contained in the integer number of scheduled bandwidth units; wherein resource scheduling indication information carried by one piece of control information indicates scheduled resource scheduling units in one scheduled bandwidth unit.

46. The method according to any one of supplements 34-45, wherein the method further includes:
transmitting resource configuration information by the network device to the terminal equipment, the resource configuration information being used to indicate one or more bandwidth units configured by the network device for the terminal equipment on a frequency carrier, the configured one or more bandwidth units including the integer number of scheduled bandwidth units.

47. The method according to supplement 46, wherein the configured one or more bandwidth units are allocation units of unlicensed frequency band resources.

48. The method according to supplement 46 or 47, wherein the number of resource blocks included in the configured bandwidth units is equal to a first value, the first value being the number of resource blocks included in an integer number of 20 MHz bandwidth resources.

49. The method according to supplement 47 or 48, wherein the resource configuration information includes position information and/or size information of the configured one or more bandwidth units.

50. The method according to supplement 49, wherein the position information includes a sequence number of a first or last resource block included in the configured bandwidth unit, and the size information includes the number of resource blocks included in the configured bandwidth unit.

51. The method according to any one of supplements 46-50, wherein high-layer configuration signaling or broadcast information transmitted by the network device includes the resource configuration information.

52. The method according to any one of supplements 46-51, wherein the resource configuration information further includes configuration information of a frequency bandwidth, the frequency bandwidth including at least one configured bandwidth unit.

53. The method according to supplement 52, wherein the configuration information of the frequency bandwidth includes an index value of a bandwidth unit configured in each frequency bandwidth in the at least one frequency bandwidth, and/or the number of bandwidth units configured in each frequency bandwidth in the at least one frequency bandwidth.

54. The method according to any one of supplements 46-53, wherein the configured one or more bandwidth units are the integer number of scheduled bandwidth units, or the method further includes:
transmitting bandwidth unit indication information by the network device to the terminal equipment, the bandwidth unit indication information being used for indicating the integer number of scheduled bandwidth units in the configured one or more bandwidth units.

55. The method according to supplement 54, wherein at least one of RRC signaling, an MAC instruction and physical layer control information transmitted by the network device includes the bandwidth unit indication information.

56. The method according to either one of supplements 54 and 55, wherein the bandwidth unit indication information includes an index of the configured bandwidth unit, or includes an index of the frequency bandwidth, or includes a bitmap corresponding to the number of the configured one or more bandwidth units, each bit of the bitmap indicating whether a corresponding configured bandwidth unit is a scheduled bandwidth unit.

57. The method according to any one of supplements 34-56, wherein there exists no overlap between the bandwidth units contained in the integer number of scheduled bandwidth units, and there exists a guard interval at two sides of the scheduled bandwidth unit.

58. The method according to supplement 57, wherein a size of the guard interval is of a default value, or a size of the guard interval is of a predetermined size, the predetermined size being determined according to a size of a subcarrier interval in the scheduled bandwidth unit and/or a size of a bandwidth of the scheduled bandwidth unit.

59. The method according to supplement 58, wherein a unit of the guard interval is hertz, or resource block, or subcarrier.

60. A resource indication method, wherein the method includes:
receiving, by a terminal equipment, resource configuration information transmitted by a network device, the resource configuration information being used for indicating one or more bandwidth units configured by the network device for the terminal equipment on a frequency carrier.

61. The method according to supplement 60, wherein the configured one or more bandwidth units are allocation units of unlicensed frequency band resources.

62. The method according to supplement 60 or 61, wherein the number of resource blocks included in the configured bandwidth units is equal to a first value, the first value being the number of resource blocks included in an integer number of 20 MHz bandwidth resources.

63. The method according to supplement 61 or 62, wherein the resource configuration information includes position information and/or size information of the configured one or more bandwidth units.

64. The method according to supplement 63, wherein the position information includes a sequence number of a first or last resource block included in the configured bandwidth unit, and the size information includes the number of resource blocks included in the configured bandwidth unit.

65. The method according to any one of supplements 60-64, wherein the terminal equipment obtains the resource configuration information via received high-layer configuration signaling or broadcast information transmitted by the network device.

66. The method according to any one of supplements 60-65, wherein the resource configuration information further includes configuration information of a frequency bandwidth, the frequency bandwidth including at least one configured bandwidth unit.

67. The method according to supplement 66, wherein the configuration information of the frequency bandwidth includes an index value of a bandwidth unit configured in each frequency bandwidth in the at least one frequency bandwidth, and/or the number of bandwidth units configured in each frequency bandwidth in the at least one frequency bandwidth.

68. The method according to any one of supplements 60-67, wherein the configured one or more bandwidth units are the integer number of scheduled bandwidth units, or the method further includes:

receiving, by the terminal equipment, bandwidth unit indication information transmitted by the network device, the bandwidth unit indication information being used for indicating the integer number of scheduled bandwidth units in the configured one or more bandwidth units;

wherein the network device schedules uplink transmission resources on the integer number of scheduled bandwidth units.

69. The method according to supplement 68, wherein the terminal equipment obtains the bandwidth unit indication information via at least one of RRC signaling, an MAC instruction and physical layer control information transmitted by the network device.

70. The method according to either one of supplements 68 and 69, wherein the bandwidth unit indication information includes an index of the configured bandwidth unit, or includes an index of the frequency bandwidth, or includes a bitmap corresponding to the number of the configured one or more bandwidth units, each bit of the bitmap indicating whether a corresponding configured bandwidth unit is a scheduled bandwidth unit.

71. A resource indication method, wherein the method includes:

transmitting resource configuration information by a network device to a terminal equipment, the resource configuration information being used for indicating one or more bandwidth units configured by the network device for the terminal equipment on a frequency carrier, the configured one or more bandwidth units including the integer number of scheduled bandwidth units.

72. The method according to supplement 71, wherein the configured one or more bandwidth units are allocation units of unlicensed frequency band resources.

73. The method according to supplement 71 or 72, wherein the number of resource blocks included in the configured bandwidth units is equal to a first value, the first value being the number of resource blocks included in an integer number of 20 MHz bandwidth resources.

74. The method according to supplement 72 or 73, wherein the resource configuration information includes position information and/or size information of the configured one or more bandwidth units.

75. The method according to supplement 74, wherein the position information includes a sequence number of a first or last resource block included in the configured bandwidth unit, and the size information includes the number of resource blocks included in the configured bandwidth unit.

76. The method according to any one of supplements 71-75, wherein high-layer configuration signaling or broadcast information transmitted by the network device includes the resource configuration information.

77. The method according to any one of supplements 71-76, wherein the resource configuration information further includes configuration information of a frequency bandwidth, the frequency bandwidth including at least one configured bandwidth unit.

78. The method according to supplement 77, wherein the configuration information of the frequency bandwidth includes an index value of a bandwidth unit configured in each frequency bandwidth in the at least one frequency bandwidth, and/or the number of bandwidth units configured in each frequency bandwidth in the at least one frequency bandwidth.

79. The method according to any one of supplements 71-78, wherein the configured one or more bandwidth units are the integer number of scheduled bandwidth units, or the method further includes:

transmitting bandwidth unit indication information by the network device to the terminal equipment, the bandwidth unit indication information being used for indicating the integer number of scheduled bandwidth units in the configured one or more bandwidth units;

wherein the network device schedules uplink transmission resources on the integer number of scheduled bandwidth units.

80. The method according to supplement 79, wherein at least one of RRC signaling, an MAC instruction and physical layer control information transmitted by the network device includes the bandwidth unit indication information.

81. The method according to either one of supplements 79 and 80, wherein the bandwidth unit indication information includes an index of the configured bandwidth unit, or includes an index of the frequency bandwidth, or includes a bitmap corresponding to the number of the configured one or more bandwidth units, each bit of the bitmap indicating whether a corresponding configured bandwidth unit is a scheduled bandwidth unit.

What is claimed is:

1. A data transmission apparatus, comprising:
a receiver configured to receive resource configuration information transmitted by the network device, the resource configuration information being used for indicating one or more bandwidth units configured for a UE on a carrier and a bandwidth unit includes a first number of contiguous resource blocks,
wherein the resource configuration information is carried by higher layer signaling and the number of resource blocks in different bandwidth units is same or different;
the receiver is further configured to receive bandwidth unit indication information, the bandwidth unit indication information being used for indicating an integer number (M1) of scheduled bandwidth units on the carrier, wherein, the integer number of scheduled bandwidth units belongs to the one or more bandwidth units configured on the carrier;
the receiver is further configured to receive resource scheduling indication information, the resource scheduling indication information being used for indicating allocated interlaces in the integer number of scheduled bandwidth units indicated by the bandwidth unit indication information; wherein an interlace is a set of resource blocks distributed spaced apart in a frequency domain with same spacing between neighboring resource blocks in the interlace;
a transmitter configured to transmit uplink data on resources in the allocated interlaces in the integer number of scheduled bandwidth units indicated by the bandwidth unit indication information;
wherein there exists a guard interval between two neighboring bandwidth units configured on the carrier, a unit of the guard interval is hertz, or resource block, or subcarrier.

2. The apparatus according to claim 1, wherein the resource scheduling indication information is carried by a control information and comprises one resource allocation domain, the resource allocation domain indicating scheduled interlaces in the integer number of scheduled bandwidth units.

3. The apparatus according to claim 1, wherein bandwidth unit indication information is carried by RRC signaling or MAC signaling or PHY control signaling.

4. The apparatus according to claim 1, wherein the apparatus further comprises:
  a processor configured to:
    perform channel monitoring before transmitting uplink data; and
    determine a bandwidth unit in the integer number of scheduled bandwidth units that are available for transmitting data according to channel monitoring result, the transmitter transmits the uplink data on overlapped actual data transmission resources of the bandwidth unit that are available for transmitting data and the resources.

5. The apparatus according to claim 4, wherein the processor is further configured to map the uplink data onto the actual data transmission resources according to a predetermined rule; wherein, the predetermined rule is that,
  the uplink data are mapped in a sequential order of the frequency domain and the time domain onto resources in one scheduled bandwidth unit in the actual data transmission resources overlapping with the resources, and then mapped in a sequential order of the frequency domain and the time domain onto resources in next one scheduled bandwidth unit in the actual data transmission resources overlapping with the resources.

6. The apparatus according to claim 1, wherein a size of the guard interval being of a default value, or a size of the guard interval being of a predetermined size, the predetermined size being determined according to a size of a subcarrier interval in the bandwidth unit and/or a size of a bandwidth of the scheduled bandwidth unit.

7. A data reception apparatus, comprising:
  a transmitter configured to transmit resource configuration information to a UE, the resource configuration information being used for indicating one or more bandwidth units configured on a carrier and a bandwidth unit includes a first number of contiguous resource blocks, and the number of resource blocks in different bandwidth units is same or different;
  wherein the resource configuration information is carried by higher layer signaling;
  the transmitter is further configured to transmit bandwidth unit indication information to the UE, the bandwidth unit indication information being used for indicating an integer number of scheduled bandwidth units on the carrier, wherein, the integer number of scheduled bandwidth units belongs to one or more bandwidth units configured on the carrier;
  the transmitter is further configured to transmit resource scheduling indication information to the UE, the resource scheduling indication information being used for indicating allocated interlaces in the integer number of scheduled bandwidth units indicated by the bandwidth unit indication information; wherein an interlace is a set of resource blocks distributed spaced apart in a frequency domain with same spacing between neighboring resource blocks in the interlace;
  a receiver configured to receive uplink data on resources in the allocated interlaces in the integer number of scheduled bandwidth units indicated by the bandwidth unit indication information;
  wherein there exists a guard interval between two neighboring bandwidth units configured on the carrier, a unit of the guard interval is hertz, or resource block, or subcarrier.

* * * * *